(12) United States Patent
Abotabl et al.

(10) Patent No.: US 11,973,722 B2
(45) Date of Patent: Apr. 30, 2024

(54) DUPLEXITY SWITCHING FOR NETWORK POWER SAVING MODES

(71) Applicant: QUALCOMM Incorporated, San Diego, CA (US)

(72) Inventors: Ahmed Attia Abotabl, San Diego, CA (US); Ahmed Elshafie, San Diego, CA (US); Muhammad Sayed Khairy Abdelghaffar, San Jose, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 17/655,975

(22) Filed: Mar. 22, 2022

(65) Prior Publication Data
US 2023/0308253 A1    Sep. 28, 2023

(51) Int. Cl.
*H04L 5/16* (2006.01)

(52) U.S. Cl.
CPC .................................. *H04L 5/16* (2013.01)

(58) Field of Classification Search
None
See application file for complete search history.

*Primary Examiner* — Hong Shao
(74) *Attorney, Agent, or Firm* — QUALCOMM Incorporated

(57) ABSTRACT

This disclosure provides systems, devices, apparatus, and methods, including computer programs encoded on storage media, for duplex switching based on network power modes. A UE may receive a first indication that a first power mode of a network entity is associated with a first duplex type for the network entity and a second power mode of the network entity is associated with a second duplex type for the network entity. The first duplex type and the second duplex type may correspond to at least one of full-duplex communication or half-duplex communication. The UE may receive a second indication of a switch from the first power mode associated with the first duplex type to the second power mode associated with the second duplex type and communicate with the network entity based on the second power mode and the second duplex type for the network entity.

30 Claims, 16 Drawing Sheets

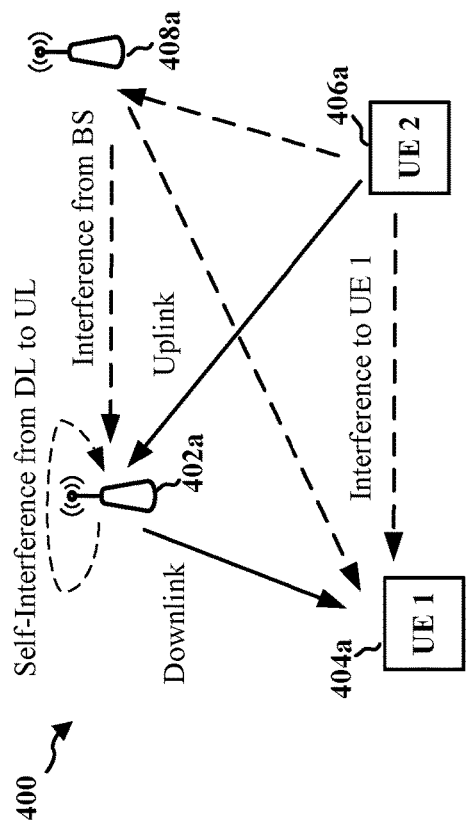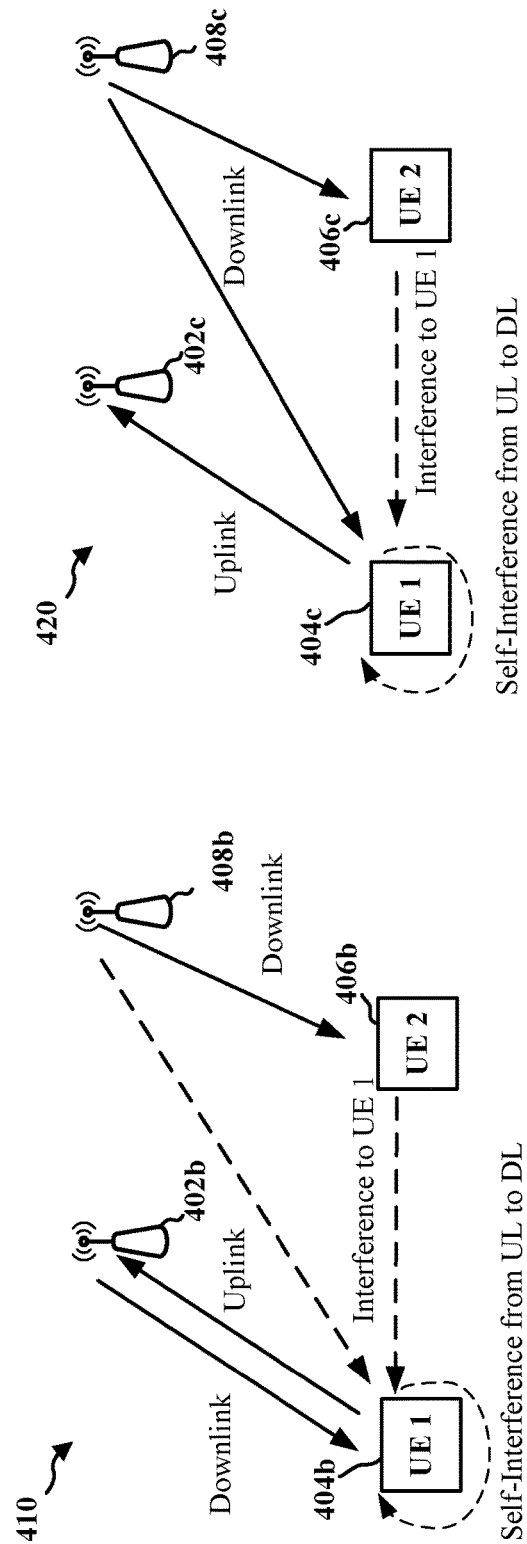
FIG. 4A
FIG. 4B
FIG. 4C

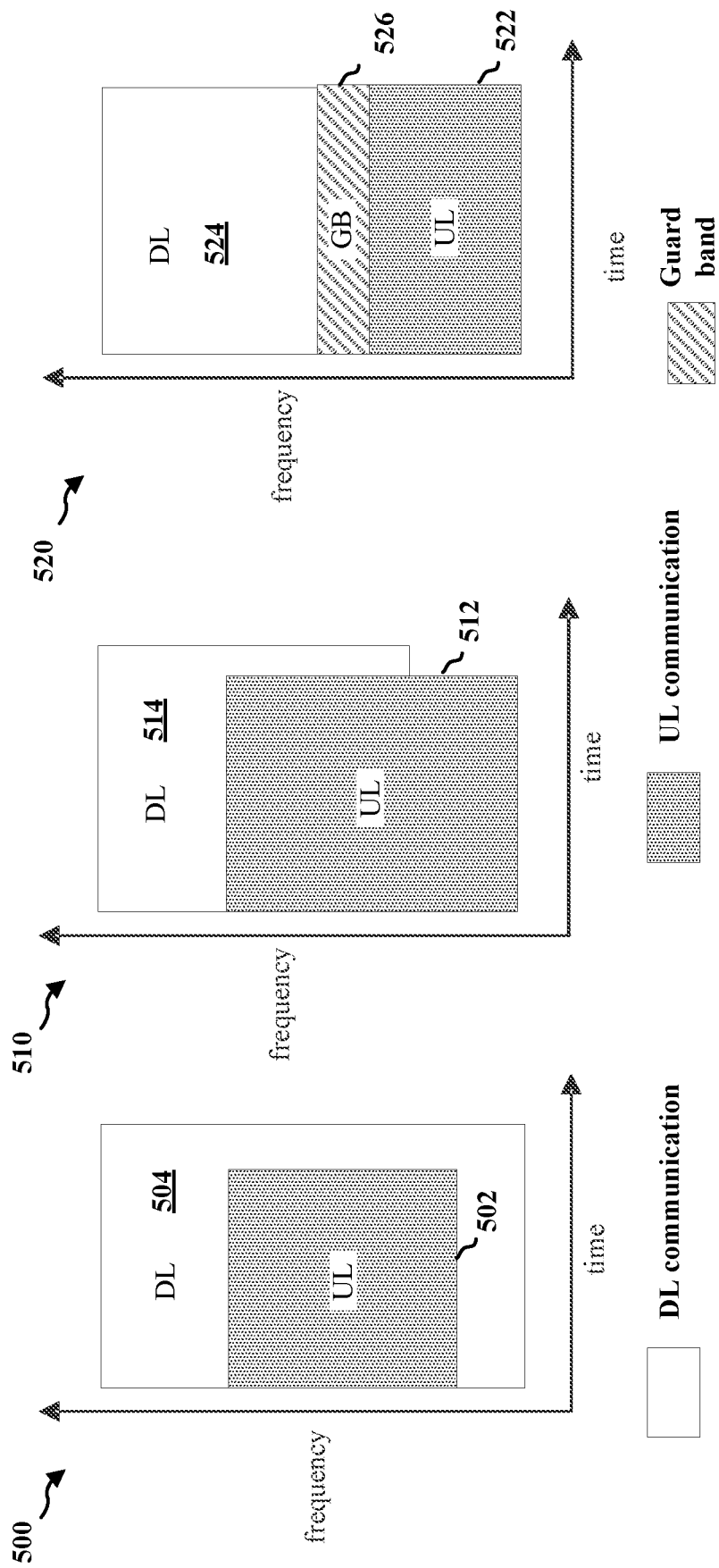

US 11,973,722 B2

DUPLEXITY SWITCHING FOR NETWORK POWER SAVING MODES

TECHNICAL FIELD

The present disclosure relates generally to communication systems, and more particularly, to duplex switching for network power saving modes.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive a first indication that a first power mode of a network entity is associated with a first duplex type for the network entity and a second power mode of the network entity is associated with a second duplex type for the network entity, the first duplex type and the second duplex type corresponding to at least one of full-duplex communication or half-duplex communication; receive a second indication of a switch from the first power mode associated with the first duplex type to the second power mode associated with the second duplex type; and communicate with the network entity based on the second power mode and the second duplex type for the network entity.

In another aspect of the disclosure, a method, a computer-readable medium, and an apparatus are provided. The apparatus may output for transmission to a user equipment (UE), a first indication that a first power mode of the network entity is associated with a first duplex type for the network entity and a second power mode of the network entity is associated with a second duplex type for the network entity, the first duplex type and the second duplex type corresponding to at least one of full-duplex communication or half-duplex communication; output for transmission to the UE, a second indication of a switch from the first power mode associated with the first duplex type to the second power mode associated with the second duplex type; and communicate with the UE based on the second power mode and the second duplex type for the network entity.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIGS. 4A, 4B, and 4C illustrate exemplary modes of full-duplex communication, in accordance with various aspects of the present disclosure.

FIGS. 5A and 5B illustrate examples of resources that are in-band full duplex (IBFD), in accordance with various aspects of the present disclosure.

FIG. 5C illustrates an example of resources for sub-band full-duplex (SBFD) communication, in accordance with various aspects of the present disclosure.

DETAILED DESCRIPTION

Figure 1:
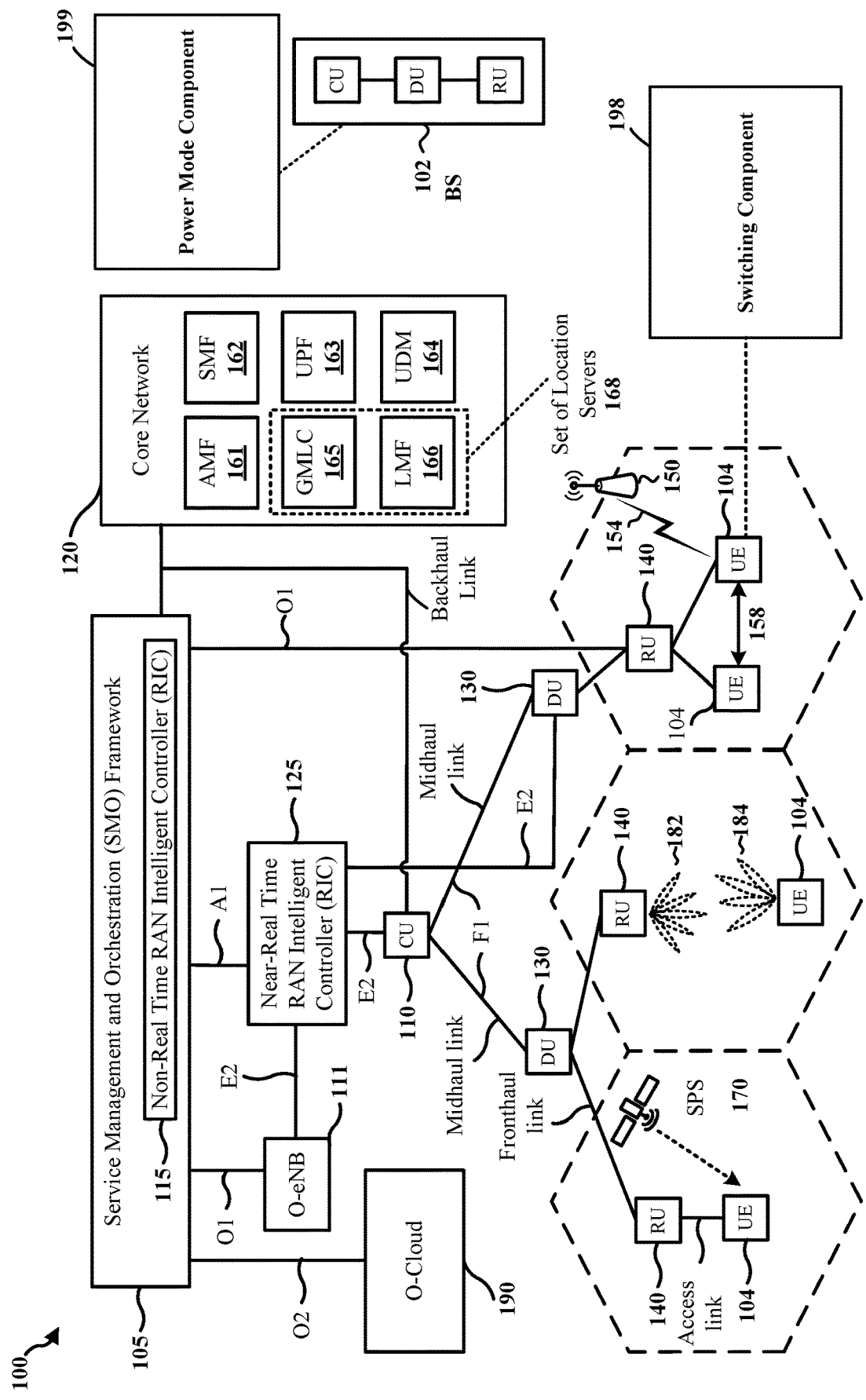
FIG. 1 is a diagram illustrating an example of a wireless communications system and an access network, in accordance with various aspects of the present disclosure.

A base station or an entity at a base station may conserve power based on different duplex modes and operations. For example, during times of low traffic (e.g., nighttime), the base station may conserve power by deactivating some of the antennas at the base station and communicating with one or more UEs in a half-duplex mode. Some UEs may be operating based on a sub-band full-duplex (SBFD) slot structure at a time that the UEs receive the indication that the base station intends to switch power modes and/or duplex modes. Accordingly, if the UEs are able to determine the duplex modes associated with the power modes of the base station before and after the switch of the power modes, the UE and the base station may adjust communications based on the switch of the power modes at the base station.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6

GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a switching component 198 configured to receive a first indication that a first power mode of a network entity is associated with a first duplex type for the network entity and a second power mode of the network entity is associated with a second duplex type for the network entity, the first duplex type and the second duplex type corresponding to at least one of full-duplex communication or half-duplex communication; receive a second indication of a switch from the first power mode associated with the first duplex type to the second power mode associated with the second duplex type; and communicate with the network entity based on the second power mode and the second duplex type for the network entity. In certain aspects, the base station 102 or a network entity of the base station 102 may include a power mode component 199 configured to transmit, to a UE, a first indication that a first power mode of the network entity is associated with a first duplex type for the network entity and a second power mode of the network entity is associated with a second duplex type for the network entity, the first duplex type and the second duplex type corresponding to at least one of full-duplex communication or half-duplex communication; transmit, to the UE, a second indication of a switch from the first power mode associated with the first duplex type to the second power mode associated with the second duplex type; and communicate with the UE based on the second power mode and the second duplex type for the network entity. Although the following description may be focused on 5G NR, the concepts described herein may be applicable to other similar areas, such as LTE, LTE-A, CDMA, GSM, and other wireless technologies.

Figure 2:
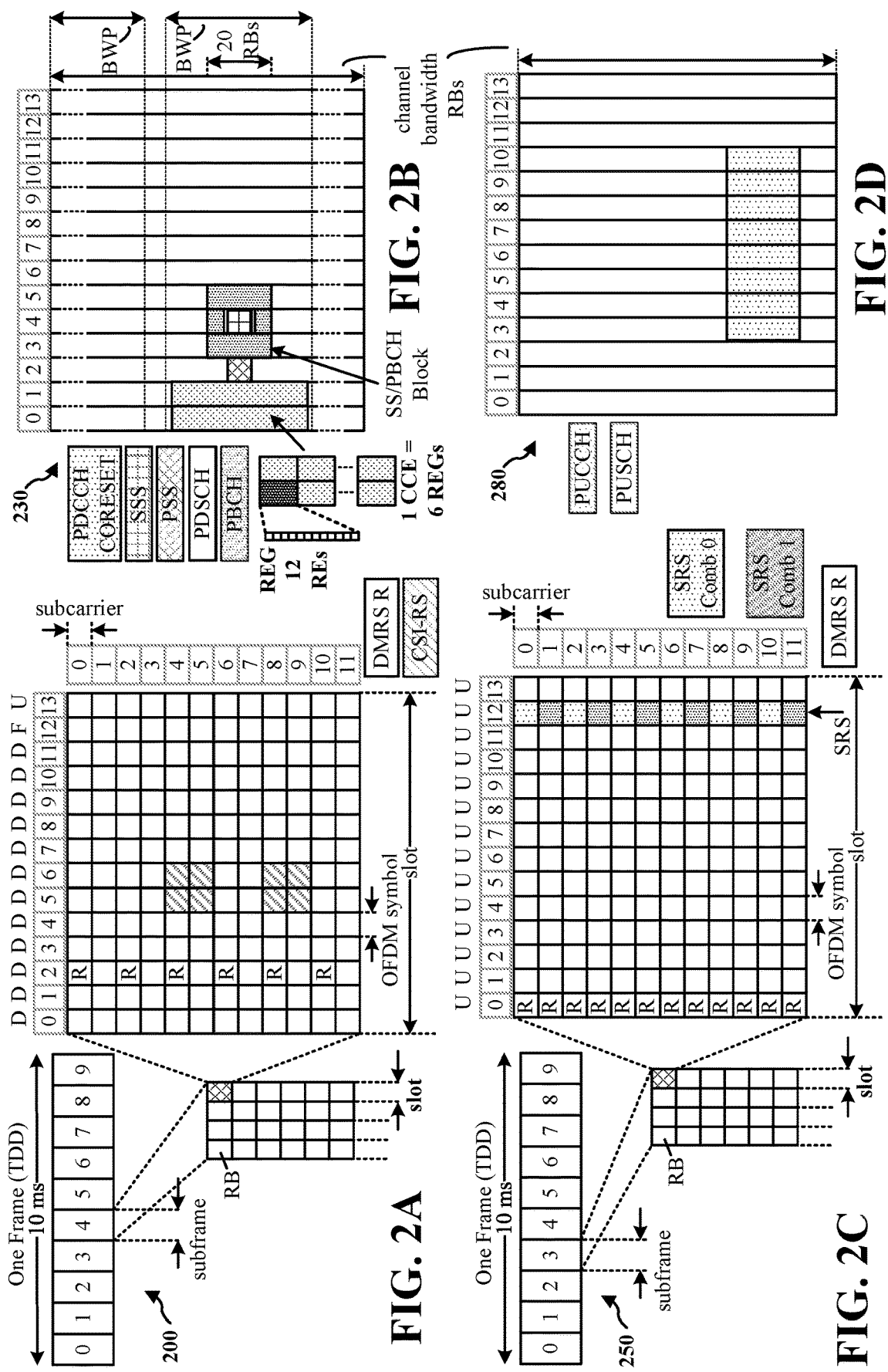
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
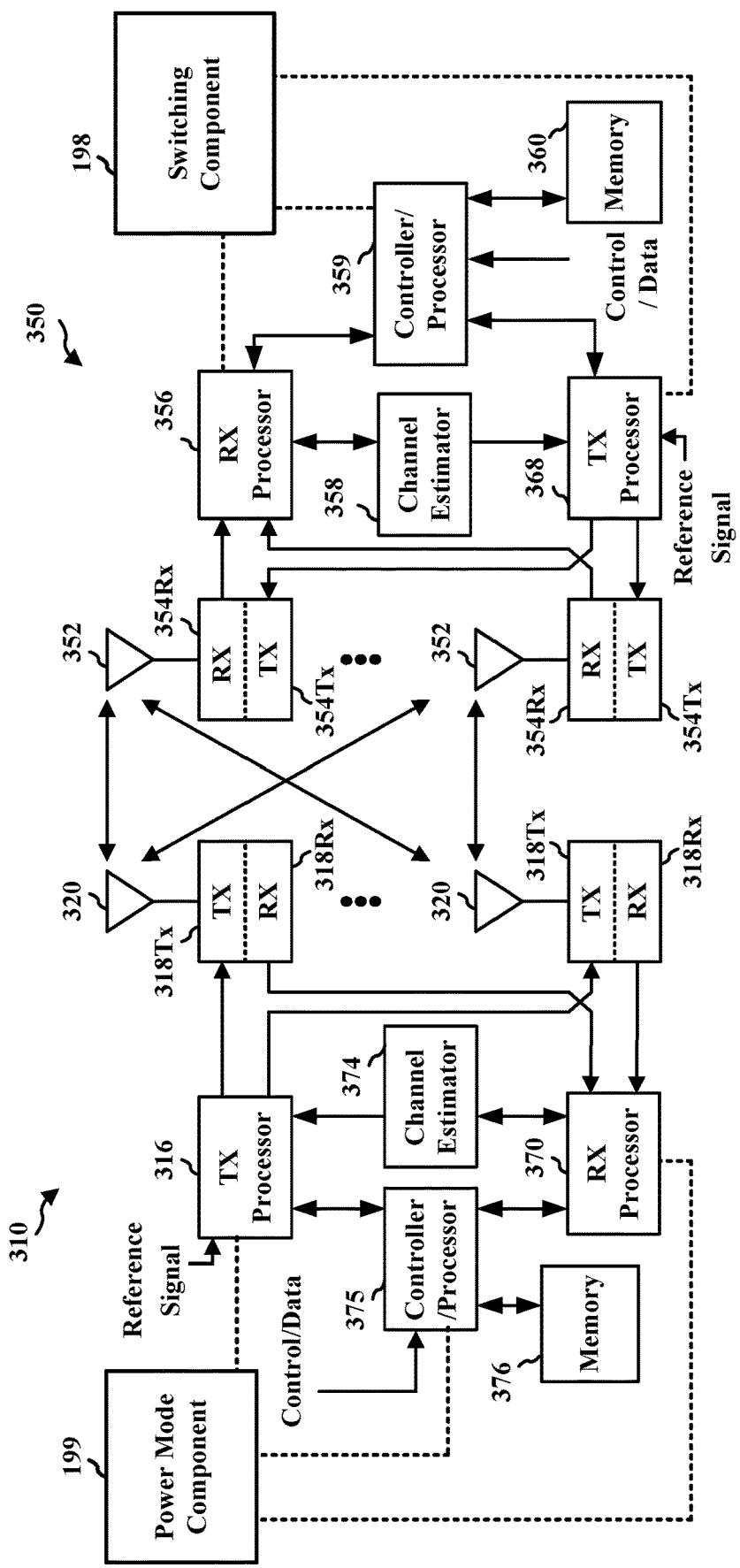
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the switching component 198 of FIG. 1.

At least one of the TX processor 316, the RX processor 370, and the controller/processor 375 may be configured to perform aspects in connection with the power mode component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

FIGS. 4A-4C illustrate various modes of full-duplex communication. Full-duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full-duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full-duplex communication 400 in which a first base station 402a is in full duplex communication with a first UE 404a and a second UE 406a. Full duplex communication refers to transmission and reception that overlaps in time. The first base station 402a is a full-duplex base station, whereas the first UE 404a and the second UE 406a may be configured as either a half-duplex UE or a full-duplex UE. The second UE 406a may transmit a first uplink signal to the first base station 402a as well as to other base stations, such as a second base station 408a in proximity to the second UE 406a. The first base station 402a transmits a downlink signal to the first UE 404a concurrently with receiving the uplink signal from the second UE 406a. The base station 402a may experience self-interference from the receiving antenna that is receiving the uplink signal from UE 406a while also receiving some of the downlink signal being transmitted to the UE 404a. The base station 402a may experience additional interference due to signals from the second base station 408a. Interference may also occur for reception at the first UE 404a based on signals from the second base station 408a as well as from uplink signals from the second UE 406a.

FIG. 4B shows a second example of full-duplex communication 410 in which a first base station 402b is in full-duplex communication with a first UE 404b. In this example, the first base station 402b is a full-duplex base station and the first UE 404b is a full-duplex UE. A full-duplex base station is a base station that transmits and receives signals that overlap in time and within a same frequency range. A full-duplex UE is a UE that transmits and receives signals that overlap in time and within a same frequency range. For example, in FIG. 4B, the first base station 402b and the UE 404b may concurrently receive and transmit communication that overlaps in time in a same frequency band. The base station and the UE may each experience self-interference, in which a device's transmitted signal leaks to (e.g., is received by) a receiver at the same device. The first UE 404b may experience additional interference based on one or more signals emitted from a second UE 406b and/or a second base station 408b in proximity to the first UE 404b.

FIG. 4C shows a third example of full-duplex communication 420 in which a first UE 404c is a full-duplex UE in communication with a first base station 402c and a second base station 408c. The first base station 402c and the second base station 408c may serve as multiple transmission and reception points (multi-TRPs) for uplink and downlink communication with the UE 404c. The second base station 408c may be in communication with a second UE 406c. In FIG. 4C, the first UE 404c may concurrently transmit an uplink signal to the first base station 402c while receiving a downlink signal from the second base station 408c. The first UE 404c may experience self-interference as a result of the first signal and the second signal being communicated simultaneously, e.g., the uplink signal may leak to (e.g., be received by) the UE's receiver. The first UE 404c may experience additional interference from the second UE 406c.

FIGS. 5A-5B illustrate a first example 500 and a second example 510 of IBFD resources. FIG. 5C illustrates an example 520 of sub-band full-duplex resources. In IBFD, signals may be transmitted and received in overlapping times and overlapping in frequency. As shown in the first example 500, a time and a frequency allocation of uplink resources 502 may fully overlap with a time and a frequency allocation of downlink resources 504. In the second example 510, a time and a frequency allocation of uplink resources 512 may partially overlap with a time and a frequency of allocation of downlink resources 514.

IBFD is in contrast to sub-band FDD, where uplink and downlink resources may overlap in time using different frequencies, as shown in FIG. 5C. As shown in FIG. 5C, the uplink resources 522 are separated from the downlink resources 524 by a guard band 526. The guard band may be frequency resources, or a gap in frequency resources, provided between the uplink resources 522 and the downlink resources 524. Separating the uplink frequency resources and the downlink frequency resources with a guard band may help to reduce self-interference. In some examples, a guard band might not be provided between the separate uplink resources and downlink resources. For example, uplink resources and downlink resources that are immediately adjacent may be considered to have a guard band width of 0. As an output signal, e.g., from a UE transmitter, may extend outside the uplink resources, the guard band may reduce interference experienced by the UE. Sub-band FDD may also be referred to as "flexible duplex".

Figure 6:
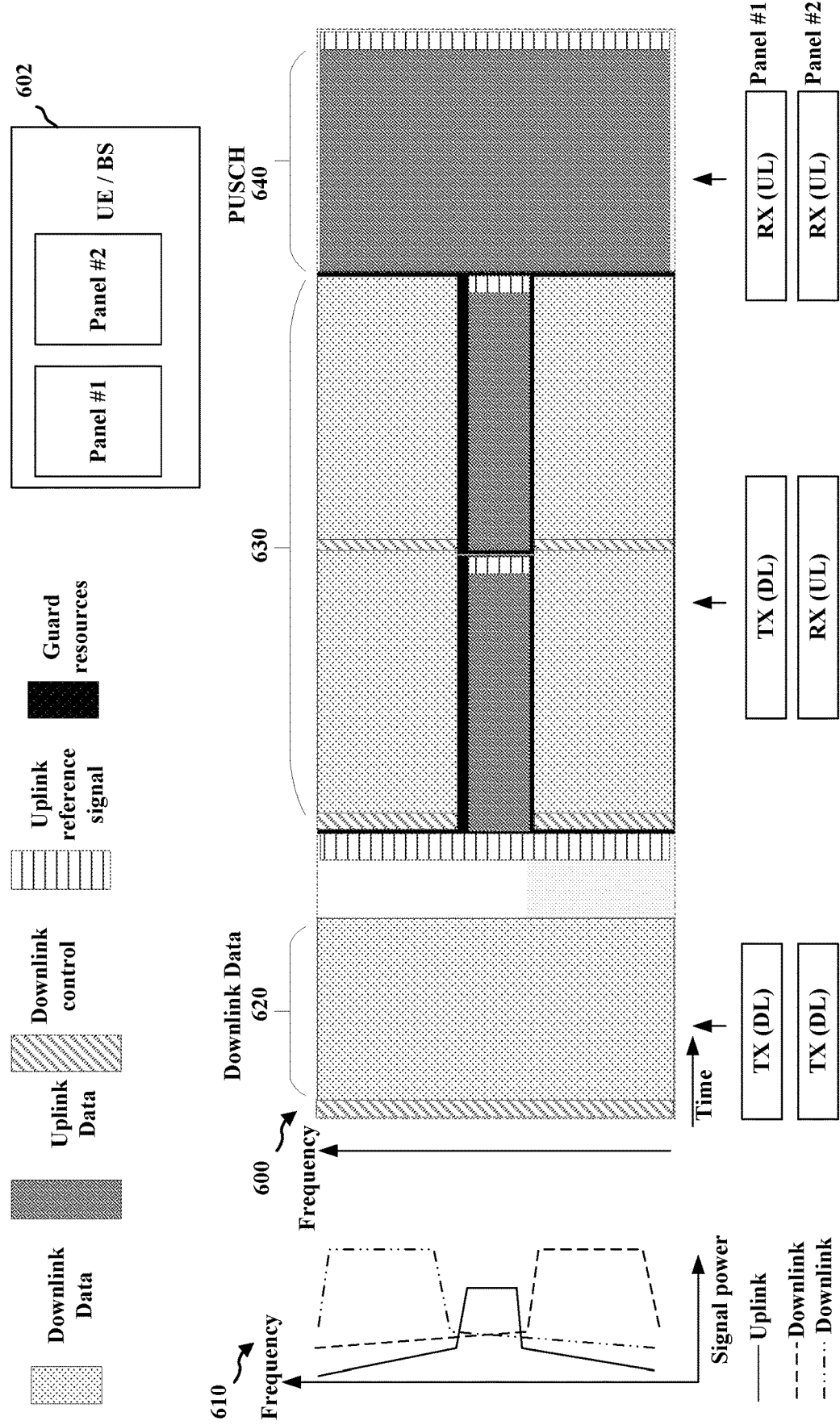
FIG. 6 is an example of time and frequency resources including full-duplex resources, in accordance with various aspects of the present disclosure.

Aspects presented herein help to provide self-interference mitigation. Aspects may help to improve isolation, such as enabling isolation greater than 50 dB. FIG. 6 illustrates an example device 602 that includes separate panels, e.g., antenna panels, for simultaneous transmission and reception in full-duplex operation. For example, the device 602 is illustrated as including panel #1 and panel #2. In some examples, panel #1 may be for downlink transmission. The downlink transmission may be at both edges of a frequency band, such as illustrated in the diagrams 600 and 610. Panel #2 may be for uplink reception, such as using frequency resources within a frequency band, such as at a middle of the frequency band.

Sub-band full duplex operations, such as described in connection with FIG. 5C may be associated with an isolation of greater than 40 dB. As shown in FIG. 5C, the downlink and uplink resources may be in different portions of a frequency band with a guard band between the uplink and downlink portions of the frequency band. FIG. 6 illustrates an example set of time and frequency resources that include both half duplex and full duplex periods. For example, the period of time 620 includes half duplex resources for downlink data, e.g., panel #1 and panel #2 may both receive downlink data during the period of time 620. The period of time 630 includes sub-band full-duplex resources for uplink transmissions (e.g., PUSCH) and downlink reception (e.g., downlink data), e.g., panel #1 may receive downlink data and panel #2 may transmit PUSCH during the period of time 630. The period of time 640 includes half duplex resources for uplink data, e.g., panel #1 and panel #2 may both transmit PUSCH during the period of time 640. FIG. 6 also includes a graph showing a signal power over frequency that shows that uplink and downlink signals leak outside of the frequency range provided in the sub-band full-duplex resources of period of time 630.

A slot format may be referred to as a "D+U" slot when the slot has a frequency band that is used for both uplink and downlink transmissions. The downlink and uplink transmissions may occur in overlapping frequency resources, such as shown in FIGS. 5A and 5B (e.g., in-band full duplex resources) or may occur in adjacent or slightly separated frequency resources, such as shown in FIG. 5C (e.g., sub-band full duplex resources). In a particular D+U symbol, a half-duplex device may either transmit in the uplink band or receive in the downlink band. In a particular D+U symbol, a full-duplex device may transmit in the uplink band and receive in the downlink band, e.g., in the same symbol or in the same slot. A D+U slot may include downlink only symbols, uplink only symbols, and full-duplex symbols. For example, in FIG. 6, the period of time 620 may extend for one or more symbols (e.g., downlink only symbols), the period of time 640 may extend for one or more symbols (e.g., uplink only symbols), and the period of time 630 may extend for one or more symbols (e.g., full-duplex symbols or D+U symbols).

In some examples, the receiver may perform windowed overlap and add (WOLA) to reduce the adjacent channel leakage ratio (ACLR) for the leakage of the uplink signal. An analog low pass filter (LPF) may improve an analog-to-digital conversion (ADC) dynamic range. The receiver automatic gain control (AGC) states may be improved in order to improve the noise figure (NF). Digital interference cancelation of the ACLR leakage, e.g., greater than 20 dB, may be used. In some examples, a non-linear model may be employed for each Tx-Rx pair.

In some examples, uplink power control may be used to mitigate self-interference. For example, a full-duplex UE may reduce the uplink transmission power, which will reduce the interference caused to downlink reception in full-duplex slots through uplink power control. Similarly, a full-duplex base station may reduce the downlink transmission power to reduce the interference caused to uplink reception in full-duplex slots through downlink power control. In some examples, different uplink power control parameters may be applied for a full-duplex slot that are different than for a half-duplex slot. In some examples, sub-band power control parameters, such as uplink power control offset or scaling, may be applied for full-duplex operation and may be different than parameters applied for half-duplex operation.

The base station may consume an increased amount of power via an increased number of antennas used by the base station for certain communications of the base station, such as NR communications. For example, the increased number of antennas may be used by the base station to serve an increased number of UEs over an increased bandwidth. Network power saving techniques may use different power modes and different operations to reduce a power consumption of the base station and maintain network operations. For instance, a reduced transmission power, a reduced number of active antennas at the base station, a reduced bandwidth, etc., may correspond to the different power modes/modes of operation used by the base station for reducing the power consumption.

The network may switch from a first power mode to a second power mode based on a network input and/or current network traffic conditions. The power modes may correspond to operational changes at the network, such as the reduced transmission power, the reduced number of active antennas, the reduced bandwidth, etc. The switch of the power modes may also change a current capability of the base station/network (e.g., based on the current network traffic conditions). For example, reducing the number of antennas and/or the transmission power may cause the capability of the base station/network to be reduced, such as by serving a reduced number of UEs via a reduced bandwidth. However, if the network only has a reduced number of UEs to serve or the network traffic is low, the network may be able to reduce the capability of the base station/network without a significant impact on communications with the reduced number of UEs. In decreased network traffic conditions, the base station may not have to activate all of the antennas included at the base station. For example, at peak communications times, such as an afternoon time, the network traffic conditions may be increased. However, at reduced communication times, such as nighttime, the network traffic conditions may be decreased and the base station/network may reduce one or more capabilities of the base station/network to conserve power. Power mode switching at the network may be based on adjustments to the bandwidth and/or the number of active antennas.

Figure 16:
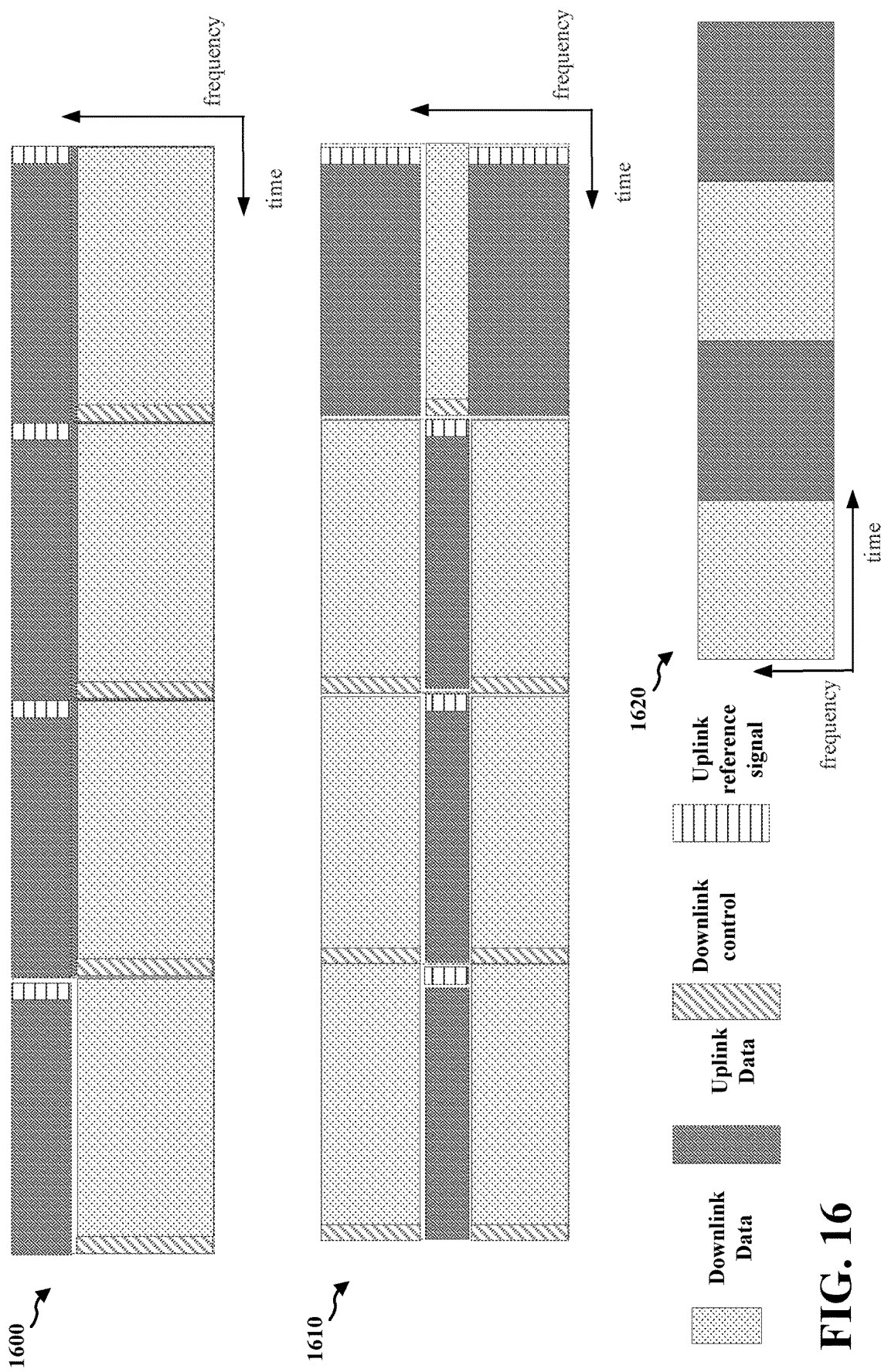
FIG. 16 includes examples example of time and frequency resources including full-duplex resources and time division duplex resources, in accordance with various aspects of the present disclosure.

Uplink coverage and latency may be increased based on full-duplex operations, where a first panel (e.g., panel #1) transmits a first communication at a same time as a second panel (e.g., panel #2) receives a second communication. For a static TDD operation, downlink and uplink communications may be time division multiplexed (TDM). That is, each slot or symbol of a TDD configuration may be used for downlink only or uplink only communications, as illustrated during the period of time 620 and the period of time 640 of the diagram 600. In FIG. 16, 1620 illustrates another example of a TDD resource structure. An example TDD configuration may include 0.5 ms downlink and uplink slot durations, where information may be communicated over a 100 MHz bandwidth. In contrast, sub-band full-duplex operations may be based on simultaneous downlink and uplink communications (e.g., via panel #1 and panel #2), where the bandwidth may be allocated into one or more downlink portions and/or one or more uplink portions. For example, the 100 MHz bandwidth may be allocated into two 40 MHz downlink bandwidth portions (e.g., 80 MHz total) with one 20 MHz uplink bandwidth portion located between the two 40 MHz downlink bandwidth portions. One or more slots of the TDD configuration (e.g., each 0.5 ms slot) may be allocated in a same or similar manner for performing sub-band full-duplex operations.

Sub-band full-duplex operations may not correspond to an FDD configuration, as the uplink and downlink portions associated with sub-band full-duplex may correspond to a same frequency band. The uplink and downlink portions may be separated by a small guard band or no guard band, such as 0-5 RBs. Self-interference may be generated in some cases from the uplink portion to the downlink portion, or from the downlink portion to the uplink portion, depending a direction of communication between the UE and the base station. Communications that have overlapping time and frequency resources may correspond to in-band full-duplex communications that may be impacted by the generated self-interference.

Sub-band full-duplex communication in an unpaired TDD spectrum/band may allow the base station to operate in a full-duplex mode, while allowing the UE to operate in either a half-duplex mode (e.g., based on one of uplink resources or downlink resources) or a full-duplex mode (e.g., based on simultaneous use of the uplink resource and the downlink resources) in the TDD band. In some slot formats, sub-band full-duplex may be configured, as illustrated in the diagram 600, with a first slot and a last slot of the TDD configuration as half-duplex slots and one or more middle slots as full-duplex slots. For example, a component carrier (CC) bandwidth may be FDD, where an uplink BWP of 20 MHz may be incorporated between two downlink BWPs of 40 MHz. A guard band may be incorporated between the uplink BWP and one or both of the downlink BWPs to reduce self-interference.

Figure 15:
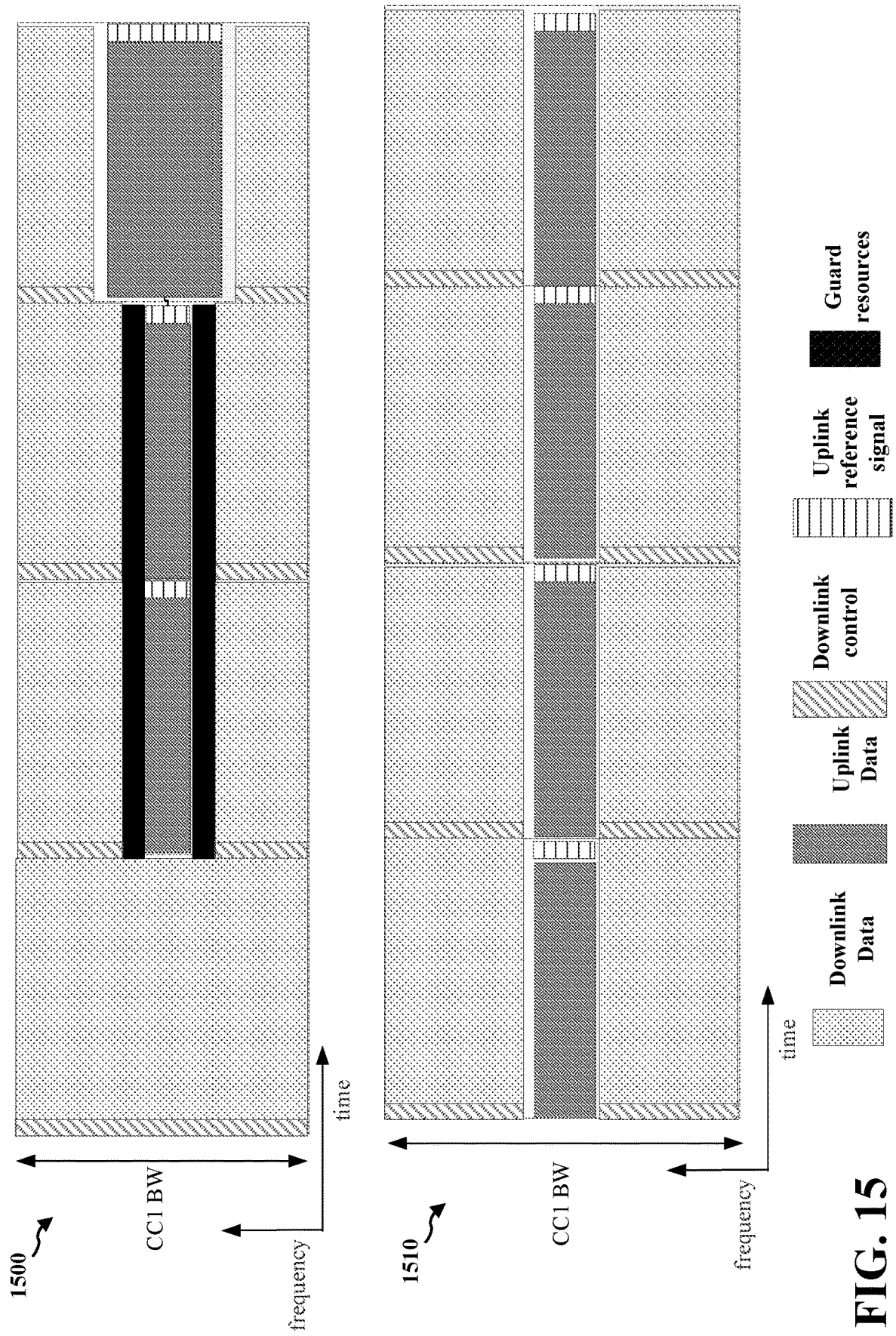
FIG. 15 includes examples of time and frequency resources including full-duplex resources, in accordance with various aspects of the present disclosure.

Other partitions of the bandwidth are also contemplated, and may be based on interference alignment between the base station and an operator. In an example, the slots may be partitioned to include different sizes of uplink/downlink BWPs (e.g., larger or smaller uplink BWPs than 20 MHz and larger or smaller downlink BWPs than 40 MHz). For instance, a first slot may be a half-duplex downlink slot with no uplink BWP, a second slot and a third slot may include a 20 MHz uplink BWP between two 40 MHz downlink BWPs, and a fourth slot may include a 40 MHz uplink BWP (e.g., increased uplink BWP) between two 20 MHz downlink BWPs (e.g., decreased downlink BWPs). In another example, an allocation of BWPs, such as the allocation illustrated for the period of time 630, may be a uniform/contiguous BWP allocation across each slot of the TDD configuration. In a further example, the uplink portion may be located at a top or a bottom of the frequency band rather between two downlink portions. In yet another example, the allocation, such as the allocation illustrated for the period of time 630, may be inverted such that the downlink portion may be located between two uplink portions, rather than the uplink portion being located between two downlink portions. There may be various configurations of time and frequency resources for FDD communication. FIGS. 15 and 16 illustrate resource diagrams 1500, 1510, 1600, and 1610 showing various example configurations of time and frequency resources for FDD communication.

Figure 7:
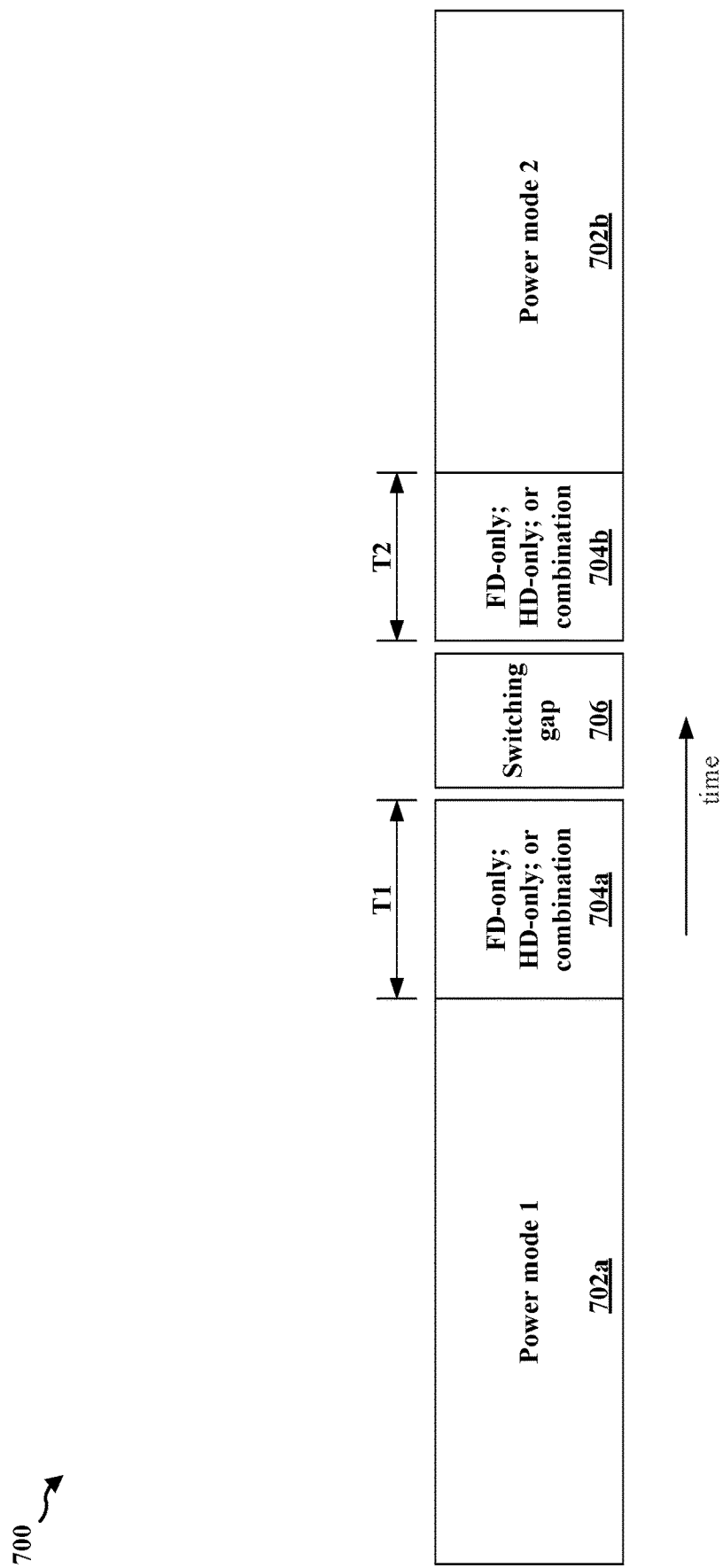
FIG. 7 is a diagram that illustrates a switch from a first power mode to a second power mode.

FIG. 7 is a diagram 700 that illustrates a switch from a first power mode 702*a* to a second power mode 702*b*. In some examples, the UE may be operating in a half-duplex mode while the base station is operating in a full-duplex mode. The base station may include a split panel architecture that supports simultaneous transmission and reception based on sub-band full-duplex slots (e.g., as illustrated in the diagram 600). In some slots, the base station may use both panels (e.g., panel #1 and panel #2) for downlink transmission. In other slots, the base station may use both panels (e.g., panel #1 and panel #2) for uplink reception. However, in sub-band full-duplex slots, the base station may use a first panel (e.g., panel #1) for downlink transmission simultaneously with a second panel (e.g., panel #2) for uplink reception. Using the panels for downlink/uplink communication may impact downlink beamforming between slots, as a number of ports and/or a power level may be different between the slots.

Power saving modes, which may also be referred to as "sleep" modes, low power modes, or reduced power modes in some aspects, may provide a reduced power consumption at the base station. The base station may utilize one or more time intervals, such as time T1 704*a* and/or time T2 704*b*, to perform full-operations duplex (e.g., and not half-duplex operation), half-duplex operations (and not full-duplex operations), or a mixed/combination of full-duplex operations and half-duplex operations, which may be performed in association with a switching gap 706 between deactivation of the first power mode 702*a* and activation of the second power mode 702*b*. The network may reduce a power consumption based on one or more determinations of when the network is going to operate in a full-duplex mode and when the network is going to operate in a half-duplex mode. A slot format that includes full-duplex slots and half-duplex slots may indicate when the network can reduce power consumption by operating in the half-duplex mode. However, in cases where the network changes a network capability (e.g., reduces a number of active antennas), the network may have to determine whether to continue following the slot format that includes the full-duplex slots.

Each power mode, or power saving mode, (e.g., the first power mode 702a and the second power mode 702b) may be associated with a particular downlink duplex mode. That is, each of the first power mode 702a and the second power mode 702b may be associated with a half-duplex mode, a full-duplex mode, or a combination thereof. Although an example is provided for two power modes, the aspects may be similarly applied for three or more power modes. One or more power modes at the network, such as a power saving mode, may be based on a reduction in a number of active antennas, a reduction in power consumption, etc.

The diagram 700 corresponds to example power mode adjustments at the network over time. For example, the network may initiate a first power mode 702a, which may conclude after time T1 704a based on certain duplex modes/parameters. After a power mode switching gap 706 following the conclusion of the first power mode 702a, the network may initiate a second power mode 702b, which may start at time T2 704b based on certain duplex modes/parameters. The UE may be RRC configured, so that when the network is operating in the first power mode 702a, the UE may determine a duplex mode of the network. For example, the UE may determine that the network operates in a full-duplex mode during the first power mode 702a. Based on the RRC configuration, the UE may also determine the duplex mode of the network when the network is operating in the second power mode 702b. For example, the UE may determine that the network operates in a half-duplex mode during the second power mode 702b.

An end of the first power mode 702a and/or a beginning of the second power mode 702b associated with time T1 704a and time T2 704b may be dedicated to half-duplex communication, full-duplex communication, or a combination of half-duplex communication and full-duplex communication on downlink. A combination of half-duplex and full duplex communications may correspond to a slot structure similar to the diagram 600. Deactivating certain antennas to transition from the first power mode 702a to the second power mode 702b may take a certain amount of time, and may impact full-duplex communications associated with the first power mode 702a. Hence, even before the switching gap 706, the network may limit communications at the end of the first power mode 702a during time T1 704a to a certain duplex type. For example, at time T1 704a, the network may communicate based on half-duplex-only communications. In further examples, at time T1 704a, the network may determine to communicate based on full-duplex-only communications or a combination of half-duplex and full-duplex communications.

A similar characteristic may occur at a beginning of the second power mode 702b. After the switching gap 706, activation/deactivation of certain antennas may take a certain amount of time. Hence, the network may limit communications at the beginning of the second power mode 702b during time T2 704b to a certain duplex type. For example, at time T2 704b, the network may communicate based on half-duplex-only communications. In further examples, at time T2 704b, the network may determine to communicate based on full-duplex-only communications or a combination of half-duplex and full-duplex communications. The duplex modes at time T1 704a and time T2 704b may be RRC configured. A power mode switching table may indicate which duplex mode the network is operating in accordance with during each of time T1 704a and time T2 704b. In an example, the network may determine to operate in a half-duplex-only mode at both of time T1 704a and time T2 704b to reduce complexity. The switching gap 706 may be indicated via DCI, broadcast information in an SSB, and/or based on resources, such as resources for CSI-RS, that may implicitly indicate to the UE that the network is switching from the first power mode 702a to the second power mode 702b.

In some cases, the network may be operating based on sub-band full-duplex (e.g., as illustrated via the diagram 600), but may then switch to a power saving mode that does not support sub-band full-duplex. Prior to the switch, the UE may be operating based a particular slot format indication (SFI), which may include many sub-band full-duplex slots. However, if the UE receives an indication from the network that the UE is to immediately limit operations based on the half-duplex mode at the network to conserve power at the network side, sub-band full-duplex slots (e.g., as illustrated in the diagram 600) included in the current slot structure of the UE may have to be interpreted as either downlink-only slots (e.g., D slots) or uplink-only slots (e.g., U slots).

The UE may be configured to convert sub-band full-duplex slots to either D slots or U slots. A conversion of the sub-band full-duplex slots to half-duplex slots may include converting the entire slot structure to a downlink band or an uplink band. In some aspects, rather than converting the entire slot structure to a downlink band, the uplink portions of the sub-band full-duplex slot may be left unused and the downlink portions of the sub-band full-duplex slot may remain in a same configuration as in the initial sub-band full-duplex slot structure. Similarly, rather than converting the entire slot structure to an uplink band, the downlink portions of the sub-band full-duplex slot may be left unused and the uplink portions of the sub-band full-duplex slot may remain in a same configuration as in the initial sub-band full-duplex slot structure.

Converting the entire sub-band full-duplex slot structure to a downlink band or an uplink band may be based on an RRC configuration. Thus, the UE may monitor for the RRC configuration from the network to determine how sub-band full-duplex slots (e.g., as illustrated in the diagram 600) are to be interpreted by the UE. For example, if the UE does not receive an indication to convert the sub-band full-duplex slot to a downlink band or an uplink band, the UE may operate based on only the downlink portions or only the uplink portions of the sub-band full-duplex format. Such operations/techniques may also be RRC configured. If the sub-band full-duplex slots are based on multiple half-duplex slot formats, the UE may determine to follow one of the multiple half-duplex slot formats based on the network indicating the switch to half-duplex operations. The determination by the UE of which half-duplex slot format to follow may be based on the RRC configuration.

The UE may determine to stop using the sub-band full-duplex slots as only D slots or only U slots based on a power mode indication received from the network. The network power mode indication may be received by the UE via DCI, which may indicate to the UE that the network is switching from the first power mode 702a to the second power mode 702b. For each power mode, a modulation and coding scheme (MCS) may be increased or decreased (e.g., based on configured tables) as well as a block error rate (BLER)

and/or an MCS range. Such adjustments may be associated with instances of forced duplex mode changes indicated to the UE. Different MCS tables or MCS indications may be used for full-duplex and half-duplex operations. However, if a sub-band full-duplex slot is converted to a D slot or a U slot, the MCS may have to be updated based on a half-duplex table. As such, the MCS may be increased or decreased based on the BLER.

Figure 8:
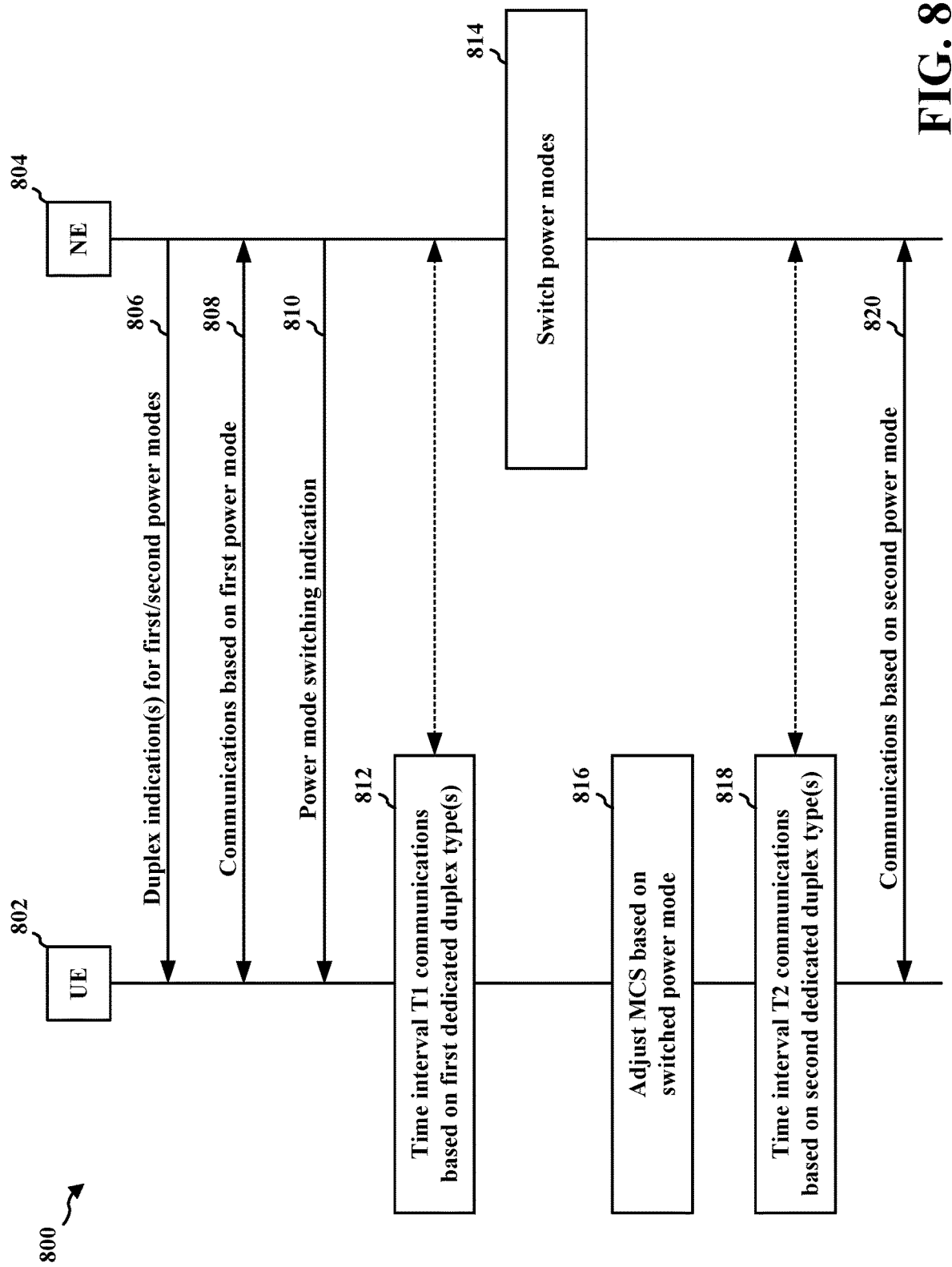
FIG. 8 is a call flow diagram illustrating communications between a UE and a network entity, in accordance with various aspects of the present disclosure.

FIG. 8 is a call flow diagram 800 illustrating communications between a UE 802 and a network entity 804. The network entity 804 may correspond to a base station or an entity at a base station, such as a CU, a DU, an RU, etc. At 806, the network entity may transmit, to the UE 802, duplex indication(s) for first/second power modes of the network entity 804. For example, the network entity 804 may indicate, at 806, that the first power mode corresponds to full-duplex communication at the network entity 804 and the second power mode corresponds to half-duplex communication at the network entity 804.

At 808, the UE 802 and the network entity 804 may communicate based on the first power mode. For example, if the network entity 804 indicates, at 806, that the first power mode corresponds to full-duplex communication at the network entity 804, the UE 802 and the network entity 804 may communicate, at 808, based on full-duplex communication at the network entity 804. At 810, the UE 802 may receive a power mode switching indication from the network entity 804. For instance, the network entity 804 may indicate, at 810, to the UE 802 that the network entity 804 intends to switch power modes (e.g., from the first power mode to the second power mode). The switch in power modes may correspond to a switch of a duplex mode at the network entity 804 (e.g., a switch from a full-duplex mode to a half-duplex mode at the network entity 804).

Based on the indication, at 810, that the network intends to switch power modes, the UE 802 may communicate, at 812, with the network entity 804 at an end of the first power mode based on first dedicated duplex types(s). For example, during the time interval T1 at the end of the first power mode, the UE 802 may communicate with the network entity 804 based on full-duplex only communications, half-duplex only communications, or a combination of full-duplex and half-duplex communications at the network entity 804.

Following time interval T1, the network entity may switch power modes, at 814, from the first power mode to the second power mode. At 816, the UE 802 may adjust an MCS based on the switched power mode. That is, the UE 802 may adjust, at 816, the MCS based on the switch, at 814, of the network entity 804 from the first power mode to the second power mode. The adjustment, at 816, of the MCS may be based on at least one of an MCS table, a BLER, or an MCS range.

During the time interval T2, which may be at or prior to the beginning of the second power mode, the UE 802 may communicate with the network entity 804 based on full-duplex only communications, half-duplex only communications, or a combination of full-duplex and half-duplex communications at the network entity 804. Following the time interval T2, the UE 802 and the network entity 804 may communicate, at 820, based on the second power mode. That is, the UE 802 and the network entity 804 may communicate, at 820, based on the switch of the power modes, at 814, by the network entity 804.

Figure 9:
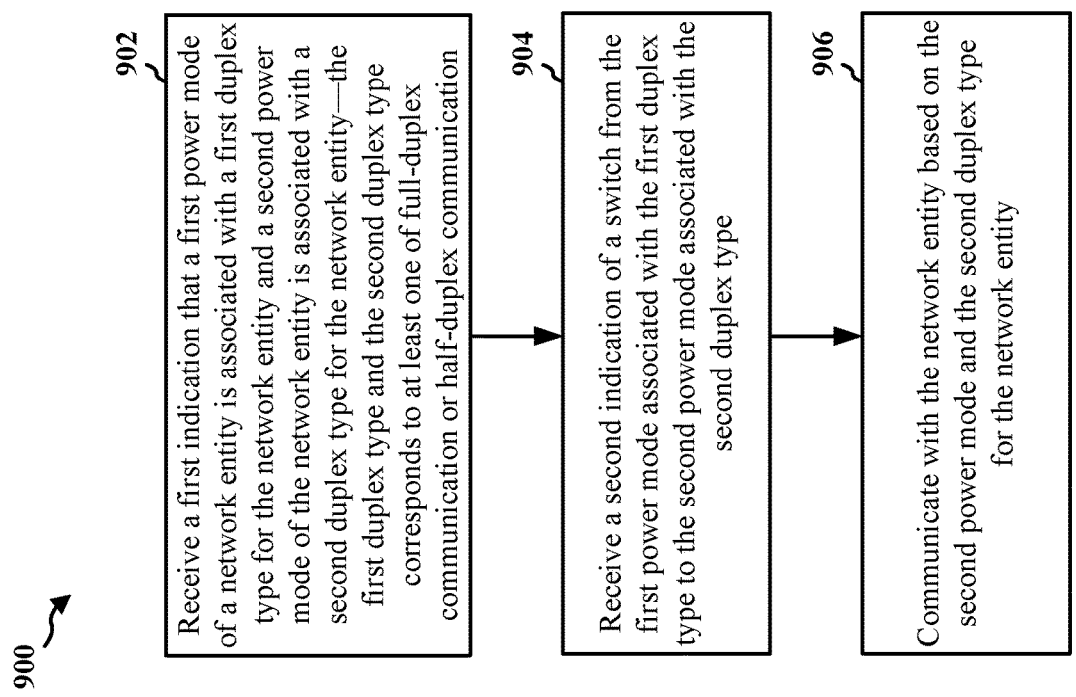
FIG. 9 is a flowchart of a method of wireless communication at a UE, in accordance with various aspects of the present disclosure.

FIG. 9 is a flowchart 900 of a method of wireless communication. The method may be performed by a UE (e.g., the UE 104, 350, 404a-404c, 406a-406c, 802, the apparatus 1304, etc.), which may include the memory 360 and which may correspond to the entire UE 104, 350, 404a-404c, 406a-406c, or apparatus 1304, or a component of the UE 104, 350, 404a-404c, 406a-406c, 802, or the apparatus 1304, such as the TX processor 368, the RX processor 356, the controller/processor 359, the cellular baseband processor 1324, and/or the application processor 1306. The method may be performed to reduce power consumption at the network.

At 902, the UE may receive a first indication that a first power mode of a network entity is associated with a first duplex type for the network entity and a second power mode of the network entity is associated with a second duplex type for the network entity-the first duplex type and the second duplex type corresponds to at least one of full-duplex communication or half-duplex communication. For example, referring to FIGS. 7-8, the UE 802 may receive, at 806, duplex indication(s) for first/second power modes of the network entity 804. That is, referring to the diagram 700, the first power mode 702a may be associated with a first duplex type (e.g., full-duplex, half-duplex, or combination thereof) and the second power mode 702b may be associated with a second duplex type (e.g., full-duplex, half-duplex, or combination thereof). The reception, at 902, may be performed by the switching component 198 of the apparatus 1304 in FIG. 13.

At 904, the UE may receive a second indication of a switch from the first power mode associated with the first duplex type to the second power mode associated with the second duplex type. For example, referring to FIGS. 7-8, the UE 802 may receive, at 810, a power mode switching indication from the network entity 804. Referring to the diagram 700, the power mode switching indication may be associated with a switching gap 706 between time T1 704a associated with the first power mode 702a and time T2 704b associated with the second power mode 702b. The reception, at 904, may be performed by the switching component 198 of the apparatus 1304 in FIG. 13.

At 906, the UE may communicate with the network entity based on the second power mode and the second duplex type for the network entity. For example, referring to FIG. 8, the UE 802 may communicate, at 820, with the network entity 804 based on the second power mode. The communication, at 906, may be performed by the switching component 198 of the apparatus 1304 in FIG. 13.

Figure 10:
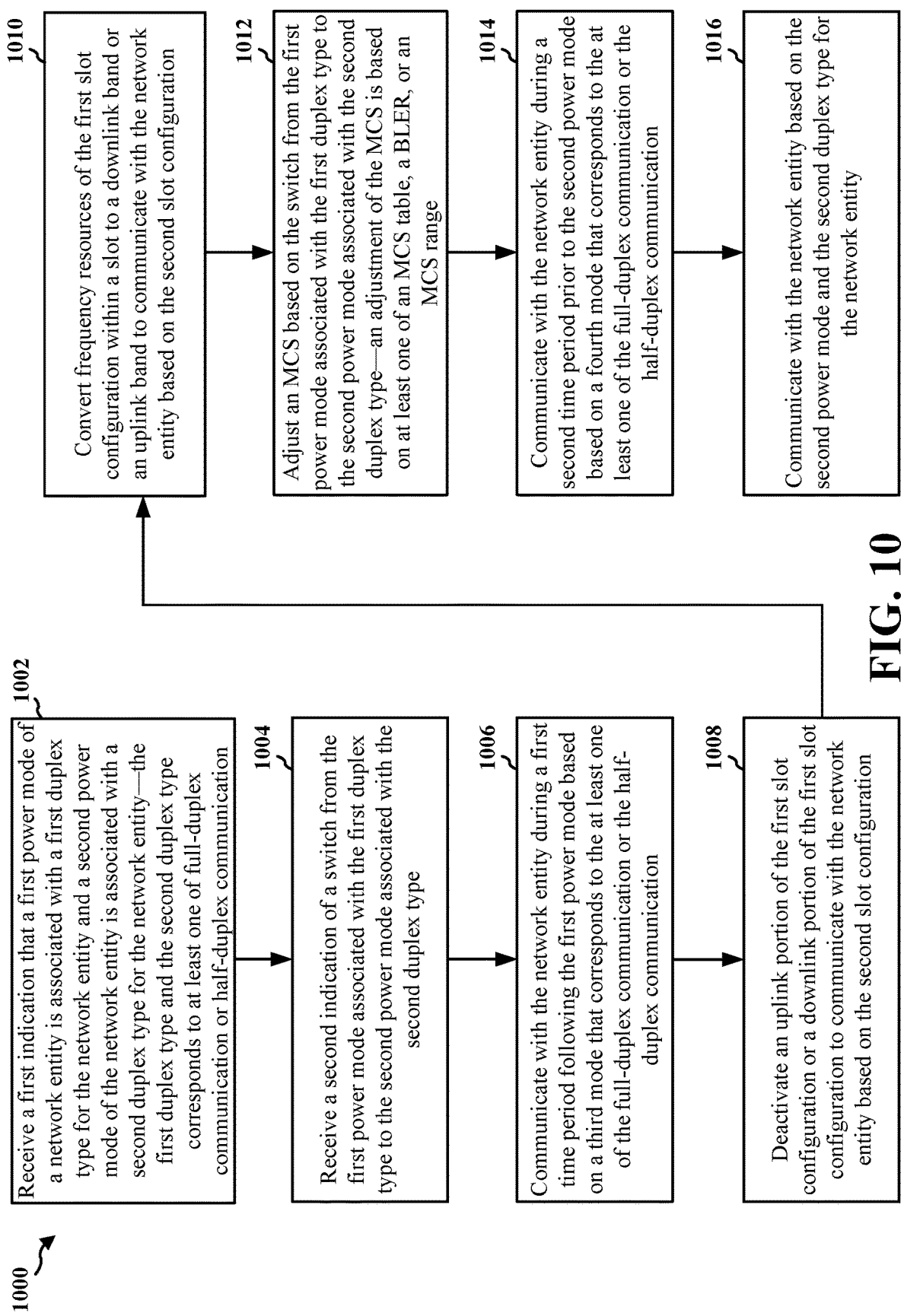
FIG. 10 is a flowchart of a method of wireless communication at a UE, in accordance with various aspects of the present disclosure.

FIG. 10 is a flowchart 1000 of a method of wireless communication. The method may be performed by a UE (e.g., the UE 104, 350, 404a-404c, 406a-406c, 802, the apparatus 1304, etc.), which may include the memory 360 and which may correspond to the entire UE 104, 350, 404a-404c, 406a-406c, or apparatus 1304, or a component of the UE 104, 350, 404a-404c, 406a-406c, 802, or the apparatus 1304, such as the TX processor 368, the RX processor 356, the controller/processor 359, the cellular baseband processor 1324, and/or the application processor 1306. The method may be performed to reduce power consumption at the network.

At 1002, the UE may receive a first indication that a first power mode of a network entity is associated with a first duplex type for the network entity and a second power mode of the network entity is associated with a second duplex type for the network entity—the first duplex type and the second duplex type corresponds to at least one of full-duplex communication or half-duplex communication. For example, referring to FIGS. 7-8, the UE 802 may receive, at 806, duplex indication(s) for first/second power modes of the network entity 804. That is, referring to the diagram 700, the first power mode 702a may be associated with a first duplex type (e.g., full-duplex, half-duplex, or combination thereof) and the second power mode 702*b* may be associated with a second duplex type (e.g., full-duplex, half-duplex, or combination thereof). The reception, at 1002, may be performed by the switching component 198 of the apparatus 1304 in FIG. 13.

At 1004, the UE may receive a second indication of a switch from the first power mode associated with the first duplex type to the second power mode associated with the second duplex type. For example, referring to FIGS. 7-8, the UE 802 may receive, at 810, a power mode switching indication from the network entity 804. Referring to the diagram 700, the power mode switching indication may be associated with a switching gap 706 between time T1 704*a* associated with the first power mode 702*a* and time T2 704*b* associated with the second power mode 702*b*. The reception, at 1004, may be performed by the switching component 198 of the apparatus 1304 in FIG. 13.

At 1006, the UE may communicate with the network entity during a first time period following the first power mode based on a third mode that corresponds to the at least one of the full-duplex communication or the half-duplex communication. For example, referring to FIGS. 7-8, the UE 802 may communicate, at 812, with the network entity 804 via time interval T1 communications based on first dedicated duplex type(s). In the diagram 700, time T1 704 may be dedicated to full-duplex only communications, half-duplex only communications, or a combination of full-duplex and half-duplex communications. The communication, at 1006, may be performed by the switching component 198 of the apparatus 1304 in FIG. 13.

At 1008, the UE may deactivate an uplink portion of the first slot configuration or a downlink portion of the first slot configuration to communicate with the network entity based on the second slot configuration. For example, referring to FIGS. 5-6, the UE may deactivate uplink resources for uplink data, uplink control, uplink reference signals, etc., which may be associated with the uplink resources 502, 512, 522, for the period of time 630 in the diagram 600, such that the UE may communicate with the network entity based on downlink resources for downlink data, downlink control, downlink reference signals, etc., which may be associated with the downlink resources 504, 514, 524, for the period of time 630 in the diagram 600. The deactivation, at 1008, may be performed by the switching component 198 of the apparatus 1304 in FIG. 13.

At 1010, the UE may convert frequency resources of the first slot configuration within a slot to a downlink band or an uplink band to communicate with the network entity based on the second slot configuration. For example, referring to FIG. 6, the UE may convert the downlink resources for the period of time 620 and the period of time 630 to uplink resources to convert the slot structure of the diagram 600 to an uplink band. In further examples, the UE may convert the uplink resources for the period of time 630 and the period of time 640 to downlink resources to convert the slot structure of the diagram 600 to a downlink band. The conversion, at 1010, may be performed by the switching component 198 of the apparatus 1304 in FIG. 13.

At 1012, the UE may adjust an MCS based on the switch from the first power mode associated with the first duplex type to the second power mode associated with the second duplex type—an adjustment of the MCS is based on at least one of an MCS table, a BLER, or an MCS range. For example, referring to FIG. 8, the UE 802 may adjust, at 816, an MCS based on the switched power mode of the network entity 804. The adjustment, at 1012, may be performed by the switching component 198 of the apparatus 1304 in FIG. 13.

At 1014, the UE may communicate with the network entity during a second time period prior to the second power mode based on a fourth mode that corresponds to the at least one of the full-duplex communication or the half-duplex communication. For example, referring to FIGS. 7-8, the UE 802 may communicate, at 818, with the network entity 804 via time interval T2 communications based on second dedicated duplex type(s). In the diagram 700, time T2 704*b* may be dedicated to full-duplex only communications, half-duplex only communications, or a combination of full-duplex and half-duplex communications. The communication, at 1014, may be performed by the switching component 198 of the apparatus 1304 in FIG. 13.

At 1016, the UE may communicate with the network entity based on the second power mode and the second duplex type for the network entity. For example, referring to FIG. 8, the UE 802 may communicate, at 820, with the network entity 804 based on the second power mode. The communication, at 1016, may be performed by the switching component 198 of the apparatus 1304 in FIG. 13.

Figure 11:
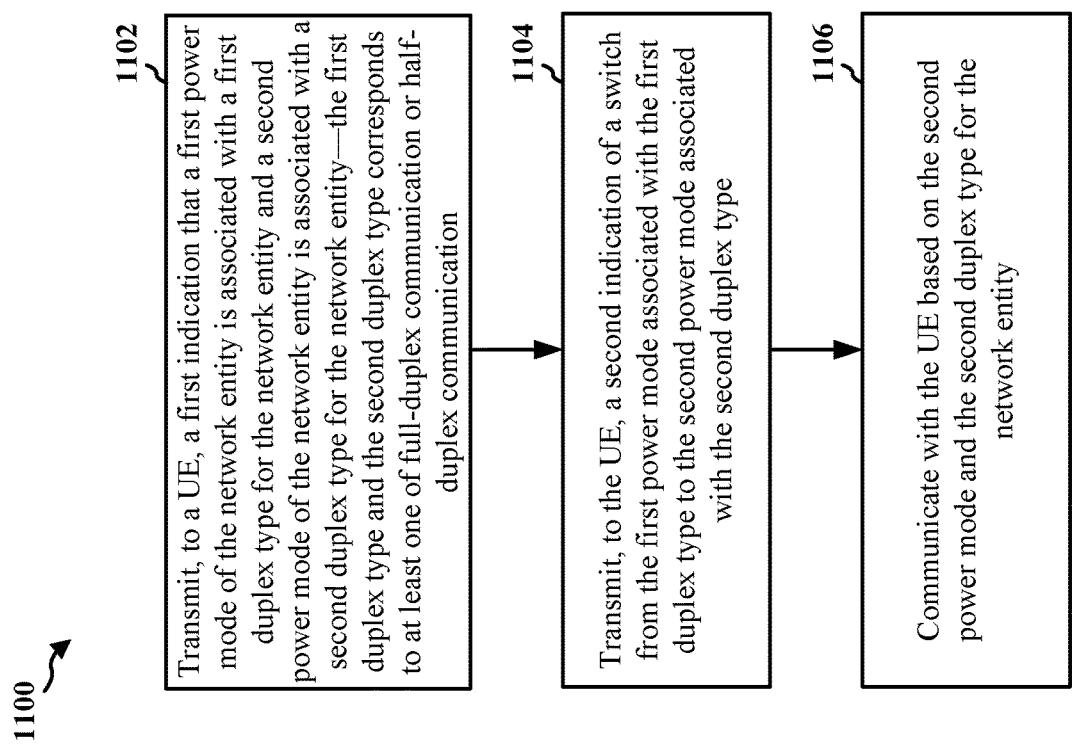
FIG. 11 is a flowchart of a method of wireless communication at a network entity, in accordance with various aspects of the present disclosure.

FIG. 11 is a flowchart 1100 of a method of wireless communication. The method may be performed by a network entity or a base station (e.g., the base station 102, 310, the network entity 804, 1402, the CU 110, the DU 130, the RU 140, etc.), which may include the memory 376 and which may correspond to the entire network entity 804, 1402 or base station 102, 310, or a component of the network entity 804, 1402 or the base station 102, 310, such as the CU 110, the DU 130, the RU 140, the TX processor 316, the RX processor 370, and/or the controller/processor 375. The method may be performed to reduce power consumption at the network.

At 1102, the network entity or the base station may transmit, to a UE, a first indication that a first power mode of the network entity is associated with a first duplex type for the network entity and a second power mode of the network entity is associated with a second duplex type for the network entity—the first duplex type and the second duplex type corresponds to at least one of full-duplex communication or half-duplex communication. For example, referring to FIG. 8, the network entity 804 may transmit, at 806, duplex indication(s) for first/second power modes of the network entity 804. That is, referring to the diagram 700, the first power mode 702*a* may be associated with a first duplex type (e.g., full-duplex, half-duplex, or combination thereof) and the second power mode 702*b* may be associated with a second duplex type (e.g., full-duplex, half-duplex, or combination thereof). The transmission, at 1102, may be performed by the power mode component 199 of the network entity 1402 in FIG. 14.

At 1104, the network entity or the base station may transmit, to the UE, a second indication of a switch from the first power mode associated with the first duplex type to the second power mode associated with the second duplex type. For example, referring to FIG. 8, the network entity 804 may transmit, at 810, a power mode switching indication to the UE 802. Referring to the diagram 700, the power mode switching indication may be associated with a switching gap 706 between time T1 704*a* associated with the first power mode 702*a* and time T2 704*b* associated with the second power mode 702*b*. The transmission, at 1104, may be performed by the power mode component 199 of the network entity 1402 in FIG. 14.

At 1106, the network entity or the base station may communicate with the UE based on the second power mode and the second duplex type for the network entity. For example, referring to FIG. 8, the network entity 804 may communicate, at 820, with the UE 802 based on the second power mode. The communication, at 1106, may be performed by the power mode component 199 of the network entity 1402 in FIG. 14.

Figure 12:
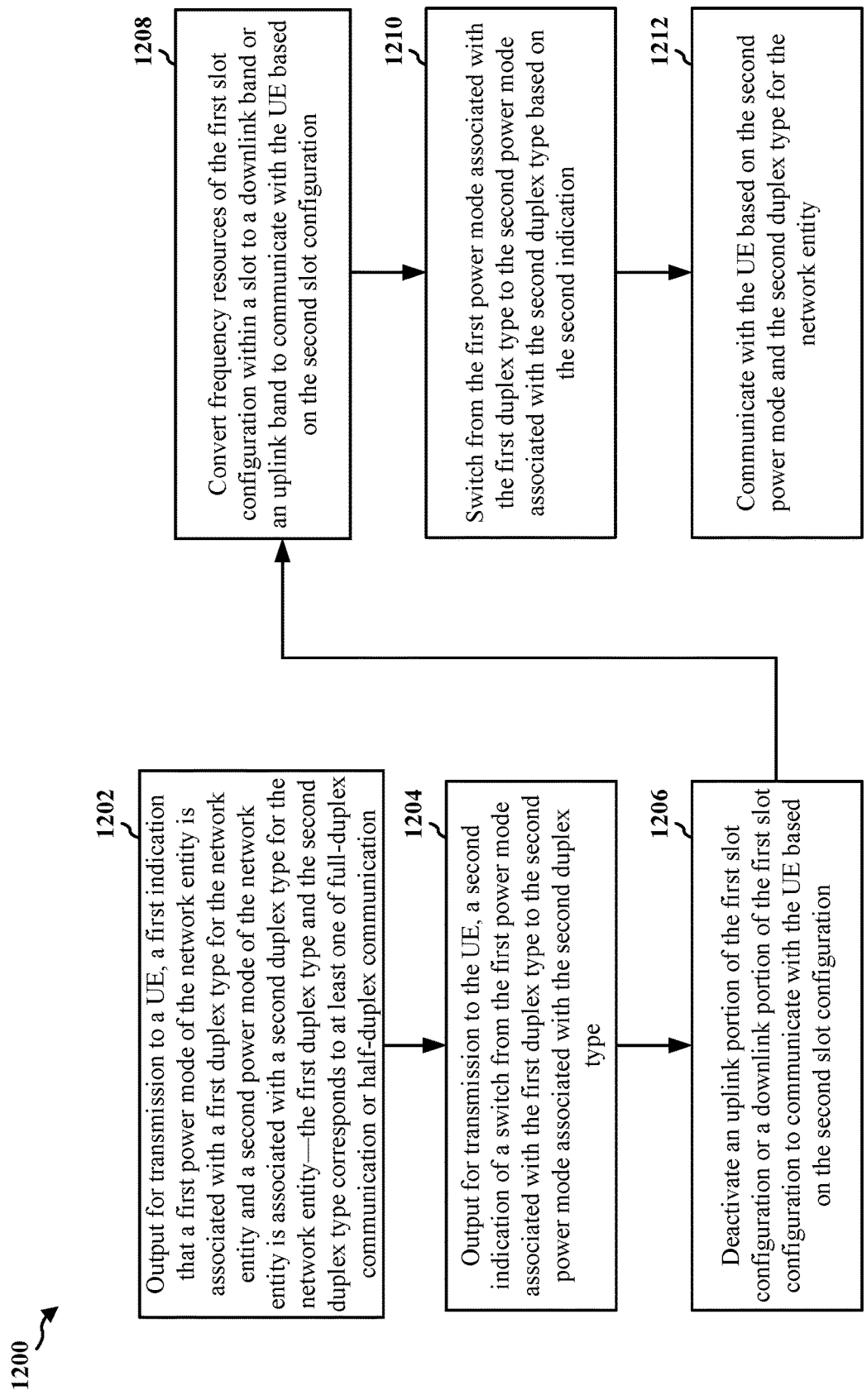
FIG. 12 is a flowchart of a method of wireless communication at a network entity, in accordance with various aspects of the present disclosure.

FIG. 12 is a flowchart 1200 of a method of wireless communication. The method may be performed by a network entity or a base station (e.g., the base station 102, 310, the network entity 804, 1402, the CU 110, the DU 130, the RU 140, etc.), which may include the memory 376 and which may correspond to the entire network entity 804, 1402 or base station 102, 310, or a component of the network entity 804, 1402 or the base station 102, 310, such as the CU 110, the DU 130, the RU 140, the TX processor 316, the RX processor 370, and/or the controller/processor 375. The method may be performed to reduce power consumption at the network.

At 1202, the network entity or the base station may transmit, or output for transmission to a UE, a first indication that a first power mode of the network entity is associated with a first duplex type for the network entity and a second power mode of the network entity is associated with a second duplex type for the network entity—the first duplex type and the second duplex type corresponds to at least one of full-duplex communication or half-duplex communication. For example, referring to FIG. 8, the network entity 804 may transmit, at 806, duplex indication(s) for first/second power modes of the network entity 804. That is, referring to the diagram 700, the first power mode 702a may be associated with a first duplex type (e.g., full-duplex, half-duplex, or combination thereof) and the second power mode 702b may be associated with a second duplex type (e.g., full-duplex, half-duplex, or combination thereof). The transmission, at 1202, may be performed by the power mode component 199 of the network entity 1402 in FIG. 14.

At 1204, the network entity or the base station may transmit, or output for transmission to the UE, a second indication of a switch from the first power mode associated with the first duplex type to the second power mode associated with the second duplex type. For example, referring to FIG. 8, the network entity 804 may transmit, at 810, a power mode switching indication to the UE 802. Referring to the diagram 700, the power mode switching indication may be associated with a switching gap 706 between time T1 704a associated with the first power mode 702a and time T2 704b associated with the second power mode 702b. The transmission, at 1204, may be performed by the power mode component 199 of the network entity 1402 in FIG. 14.

At 1206, the network entity or the base station may deactivate an uplink portion of the first slot configuration or a downlink portion of the first slot configuration to communicate with the UE based on the second slot configuration. For example, referring to FIGS. 5-6, the network entity may deactivate uplink resources for uplink data, uplink control, uplink reference signals, etc., which may be associated with the uplink resources 502, 512, 522, for the period of time 630 in the diagram 600, such that the network entity may communicate with the UE based on downlink resources for downlink data, downlink control, downlink reference signals, etc., which may be associated with the downlink resources 504, 514, 524, for the period of time 630 in the diagram 600. The deactivation, at 1206, may be performed by the power mode component 199 of the network entity 1402 in FIG. 14.

At 1208, the network entity or the base station may convert frequency resources of the first slot configuration within a slot to a downlink band or an uplink band to communicate with the UE based on the second slot configuration. For example, referring to FIG. 6, the network entity may convert the downlink resources for the period of time 620 and the period of time 630 to uplink resources to convert the slot structure of the diagram 600 to an uplink band. In further examples, the network entity may convert the uplink resources for the period of time 630 and the period of time 640 to downlink resources to convert the slot structure of the diagram 600 to a downlink band. The conversion, at 1208, may be performed by the power mode component 199 of the network entity 1402 in FIG. 14.

At 1210, the network entity or the base station may switch from the first power mode associated with the first duplex type to the second power mode associated with the second duplex type based on the second indication. For example, referring to FIG. 8, the network entity 804 may switch power modes, at 814. Referring to the diagram 700, the network entity may switch power modes based on the switching gap 706 included between the first power mode 702a to the second power mode 702b. The switching, at 1210, may be performed by the power mode component 199 of the network entity 1402 in FIG. 14.

At 1212, the network entity or the base station may communicate with the UE based on the second power mode and the second duplex type for the network entity. For example, referring to FIG. 8, the network entity 804 may communicate, at 820, with the UE 802 based on the second power mode. The communication, at 1212, may be performed by the power mode component 199 of the network entity 1402 in FIG. 14.

Figure 13:
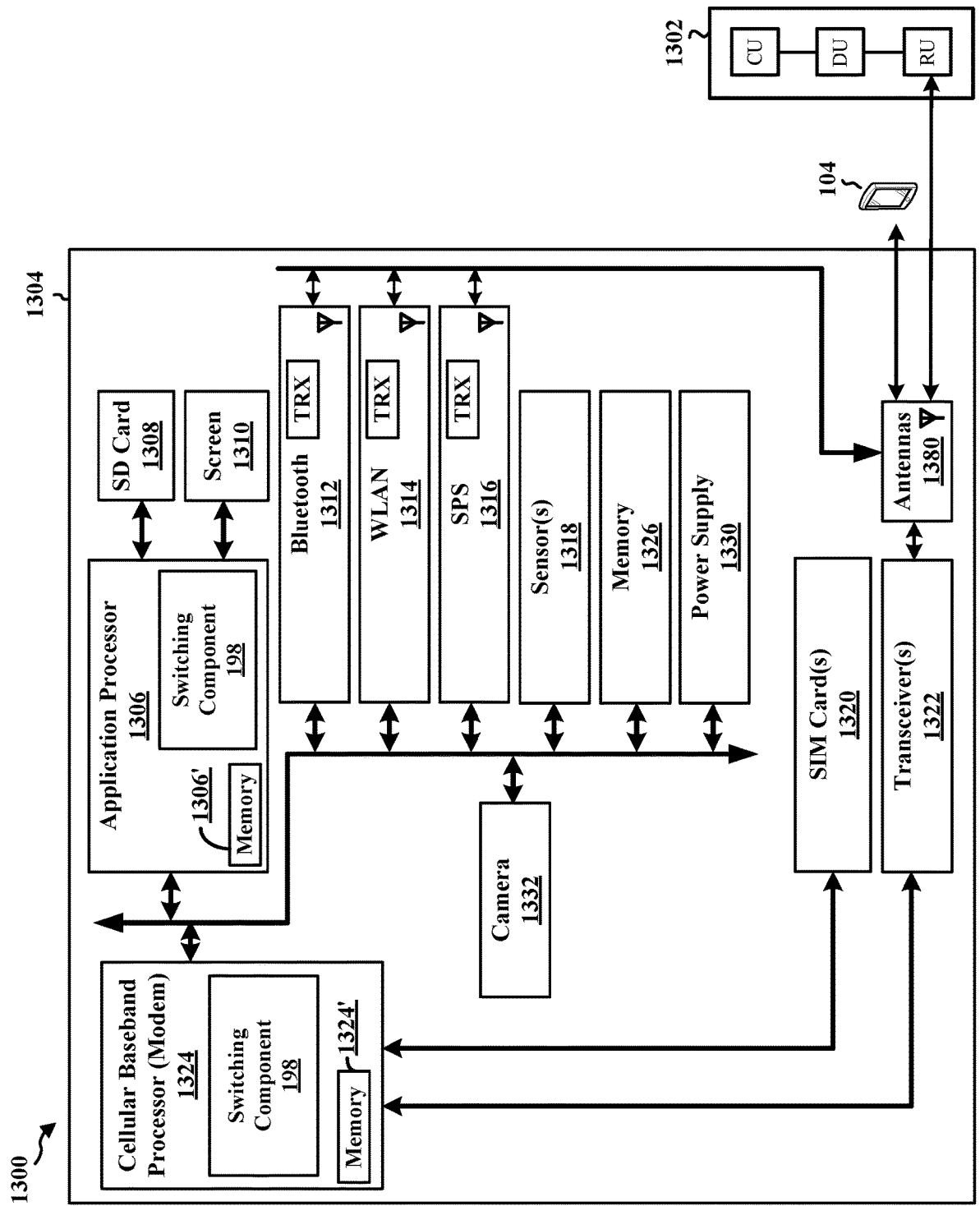
FIG. 13 is a diagram illustrating an example of a hardware implementation for an example apparatus and/or network entity, in accordance with various aspects of the present disclosure.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional modules of memory 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional modules of memory 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see 350 of FIG. 3) and include the additional modules of the apparatus 1304.

As discussed supra, the switching component 198 is configured to receive a first indication that a first power mode of a network entity is associated with a first duplex type for the network entity and a second power mode of the network entity is associated with a second duplex type for the network entity, the first duplex type and the second duplex type corresponding to at least one of full-duplex communication or half-duplex communication; receive a second indication of a switch from the first power mode associated with the first duplex type to the second power mode associated with the second duplex type; and communicate with the network entity based on the second power mode and the second duplex type for the network entity. The switching component 198 may be within the cellular baseband processor 1324, the application processor 1306, or both the cellular baseband processor 1324 and the application processor 1306. The switching component 198 may be one or more hardware components specifically configured to carry out the stated processes/algorithm, implemented by one or more processors configured to perform the stated processes/algorithm, stored within a computer-readable medium for implementation by one or more processors, or some combination thereof.

As shown, the apparatus 1304 may include a variety of components configured for various functions. In one configuration, the apparatus 1304, and in particular the cellular baseband processor 1324 and/or the application processor 1306, includes means for receiving a first indication that a first power mode of a network entity is associated with a first duplex type for the network entity and a second power mode of the network entity is associated with a second duplex type for the network entity, the first duplex type and the second duplex type corresponding to at least one of full-duplex communication or half-duplex communication; means for receiving a second indication of a switch from the first power mode associated with the first duplex type to the second power mode associated with the second duplex type; and means for communicating with the network entity based on the second power mode and the second duplex type for the network entity. The apparatus 1304 further includes means for communicating with the network entity during a first time period following the first power mode based on a third mode that corresponds to the at least one of the full-duplex communication or the half-duplex communication. The apparatus 1304 further includes means for communicating with the network entity during a second time period prior to the second power mode based on a fourth mode that corresponds to the at least one of the full-duplex communication or the half-duplex communication. The apparatus 1304 further includes means for deactivating an uplink portion of the first slot configuration or a downlink portion of the first slot configuration to communicate with the network entity based on the second slot configuration. The apparatus 1304 further includes means for converting frequency resources of the first slot configuration within a slot to a downlink band or an uplink band to communicate with the network entity based on the second slot configuration. The apparatus 1304 further includes means for receiving an RRC configuration indicating one of the multiple half-duplex slot formats for the second slot configuration. The apparatus 1304 further includes means for adjusting an MCS based on the switch from the first power mode associated with the first duplex type to the second power mode associated with the second duplex type, an adjustment of the MCS being based on at least one of an MCS table, a BLER, or an MCS range.

The means may be the switching component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
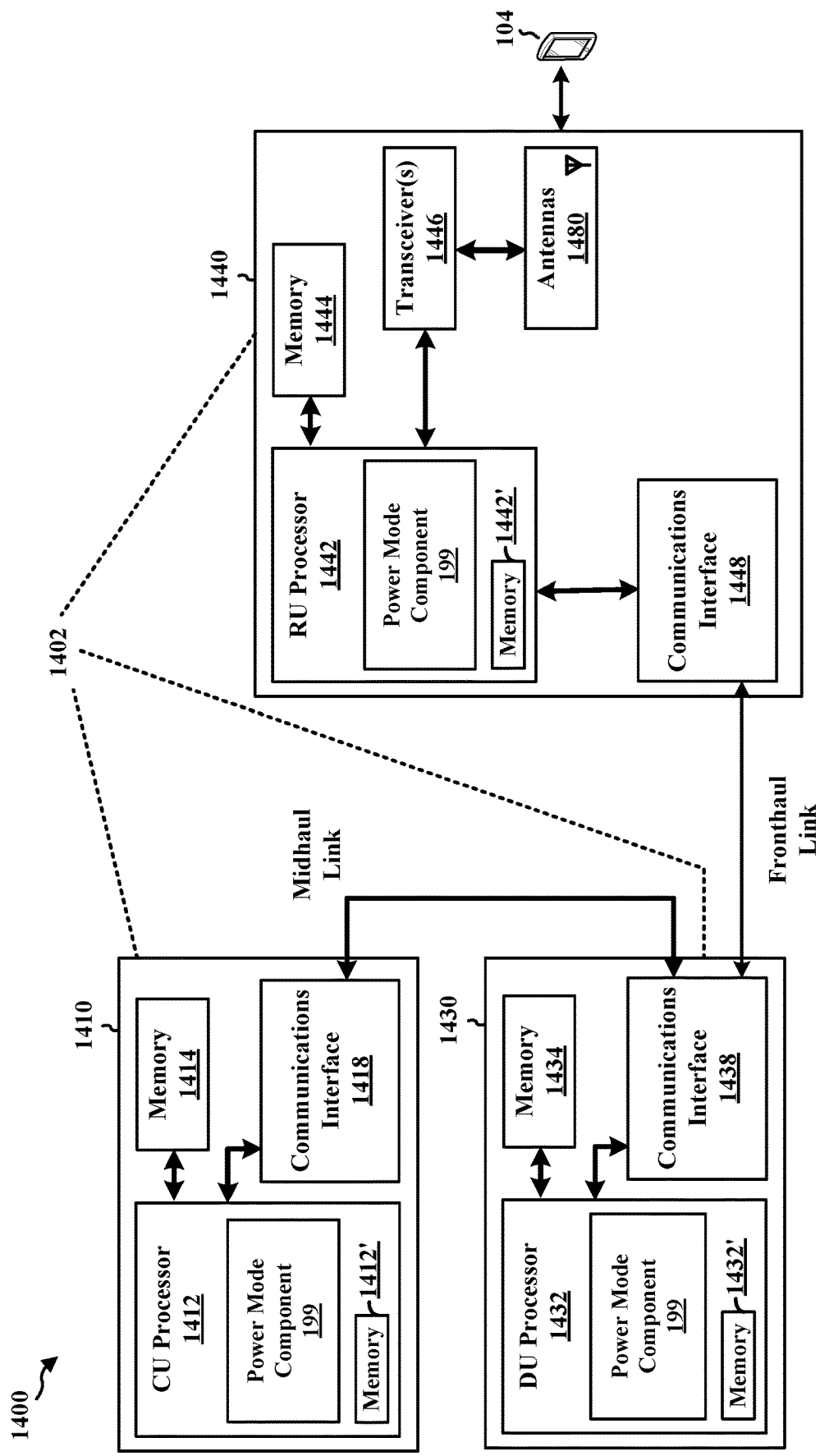
FIG. 14 is a diagram illustrating an example of a hardware implementation for an example network entity, in accordance with various aspects of the present disclosure.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the power mode component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s)

causes the processor(s) to perform the various functions described supra. The computer-readable medium/memory may also be used for storing data that is manipulated by the processor(s) when executing software.

As discussed supra, the power mode component 199 is configured to transmit, to a UE, a first indication that a first power mode of the network entity is associated with a first duplex type for the network entity and a second power mode of the network entity is associated with a second duplex type for the network entity, the first duplex type and the second duplex type corresponding to at least one of full-duplex communication or half-duplex communication; transmit, to the UE, a second indication of a switch from the first power mode associated with the first duplex type to the second power mode associated with the second duplex type; and communicate with the UE based on the second power mode and the second duplex type for the network entity. The power mode component 199 may be within one or more processors of one or more of the CU 1410, DU 1430, and the RU 1440. The power mode component 199 may be one or more hardware components specifically configured to carry out the stated processes/algorithm, implemented by one or more processors configured to perform the stated processes/algorithm, stored within a computer-readable medium for implementation by one or more processors, or some combination thereof.

The network entity 1402 may include a variety of components configured for various functions. In one configuration, the network entity 1402 includes means for transmitting, to a UE, a first indication that a first power mode of the network entity is associated with a first duplex type for the network entity and a second power mode of the network entity is associated with a second duplex type for the network entity, the first duplex type and the second duplex type corresponding to at least one of full-duplex communication or half-duplex communication; means for transmitting, to the UE, a second indication of a switch from the first power mode associated with the first duplex type to the second power mode associated with the second duplex type; and means for communicating with the UE based on the second power mode and the second duplex type for the network entity. The network entity 1402 further includes means for switching from the first power mode associated with the first duplex type to the second power mode associated with the second duplex type based on the second indication. The network entity 1402 further includes means for deactivating an uplink portion of the first slot configuration or a downlink portion of the first slot configuration to communicate with the UE based on the second slot configuration. The network entity 1402 further includes means for converting frequency resources of the first slot configuration within a slot to a downlink band or an uplink band to communicate with the UE based on the second slot configuration. The network entity 1402 further includes means for transmitting an RRC configuration indicating one of the multiple half-duplex slot formats for the second slot configuration. The network entity 1402 further includes means for adjusting an MCS based on the switch from the first power mode associated with the first duplex type to the second power mode associated with the second duplex type, an adjustment of the MCS being based on at least one of an MCS table, a BLER, or an MCS range.

The means may be the power mode component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: receiving a first indication that a first power mode of a network entity is associated with a first duplex type for the network entity and a second power mode of the network entity is associated with a second duplex type for the network entity, the first duplex type and the second duplex type corresponding to at least one of full-duplex communication or half-duplex communication; receiving a second indication of a switch from the first power mode associated with the first duplex type to the second power mode associated with the second duplex type; and communicating with the network entity based on the second power mode and the second duplex type for the network entity.

Aspect 2 may be combined with aspect 1 and further includes communicating with the network entity during a first time period following the first power mode based on a third mode that corresponds to the at least one of the full-duplex communication or the half-duplex communication.

Aspect 3 may be combined with any of aspects 1-2 and includes that the third mode corresponds to a combination of duplex modes.

Aspect 4 may be combined with any of aspects 1-3 and further includes communicating with the network entity during a second time period prior to the second power mode based on a fourth mode that corresponds to the at least one of the full-duplex communication or the half-duplex communication.

Aspect 5 may be combined with any of aspects 1-4 and includes that the fourth mode corresponds to a combination of duplex modes.

Aspect 6 may be combined with any of aspects 1-5 and includes that the switch from the first power mode associated with the first duplex type to the second power mode associated with the second duplex type is based on a time gap included between the first power mode and the second power mode.

Aspect 7 may be combined with any of aspects 1-6 and includes that the first power mode corresponds to a first slot configuration associated with the full-duplex communication and the second power mode corresponds to a second slot configuration associated with the half-duplex communication.

Aspect 8 may be combined with any of aspects 1-7 and includes that the first slot configuration corresponds to a sub-band full-duplex (SBFD) slot configuration or an in-band full-duplex (IBFD) slot configuration.

Aspect 9 may be combined with any of aspects 1-8 and further includes deactivating an uplink portion of the first slot configuration or a downlink portion of the first slot configuration to communicate with the network entity based on the second slot configuration.

Aspect 10 may be combined with any of aspects 1-9 and further includes converting frequency resources of the first slot configuration within a slot to a downlink band or an uplink band to communicate with the network entity based on the second slot configuration.

Aspect 11 may be combined with any of aspects 1-10 and includes that the first slot configuration includes multiple half-duplex slot formats, the aspect further including receiving an RRC configuration indicating one of the multiple half-duplex slot formats for the second slot configuration.

Aspect 12 may be combined with any of aspects 1-11 and includes that the first power mode corresponds to a first slot configuration associated with the half-duplex communication and the second power mode corresponds to a second slot configuration associated with the full-duplex communication.

Aspect 13 may be combined with any of aspects 1-12 and includes that the second slot configuration corresponds to a SBFD slot configuration or an IBFD slot configuration.

Aspect 14 may be combined with any of aspects 1-13 and further includes adjusting an MCS based on the switch from the first power mode associated with the first duplex type to the second power mode associated with the second duplex type, an adjustment of the MCS being based on at least one of an MCS table, a BLER, or an MCS range.

Aspect 15 is a method of wireless communication at a network entity, including: outputting for transmission to a UE, a first indication that a first power mode of the network entity is associated with a first duplex type for the network entity and a second power mode of the network entity is associated with a second duplex type for the network entity, the first duplex type and the second duplex type corresponding to at least one of full-duplex communication or half-duplex communication; outputting for transmission to the UE, a second indication of a switch from the first power mode associated with the first duplex type to the second power mode associated with the second duplex type; and communicating with the UE based on the second power mode and the second duplex type for the network entity.

Aspect 16 may be combined with aspect 15 and further includes switching from the first power mode associated with the first duplex type to the second power mode associated with the second duplex type based on the second indication.

Aspect 17 may be combined with any of aspects 15-16 and includes that the first power mode of the network entity includes a first time period following the first power mode based on a third mode that corresponds to the at least one of the full-duplex communication or the half-duplex communication.

Aspect 18 may be combined with any of aspects 15-17 and includes that the third mode corresponds to a combination of duplex modes.

Aspect 19 may be combined with any of aspects 15-18 and includes that the second power mode of the network entity includes a second time period prior to the second power mode based on a fourth mode that corresponds to the at least one of the full-duplex communication or the half-duplex communication.

Aspect 20 may be combined with any of aspects 15-19 and includes that the fourth mode corresponds to a combination of duplex modes.

Aspect 21 may be combined with any of aspects 15-20 and includes that the switch from the first power mode associated with the first duplex type to the second power mode associated with the second duplex type is based on a time gap included between the first power mode and the second power mode.

Aspect 22 may be combined with any of aspects 15-21 and includes that the first power mode corresponds to a first slot configuration associated with the full-duplex communication and the second power mode corresponds to a second slot configuration associated with the half-duplex communication.

Aspect 23 may be combined with any of aspects 15-22 and includes that the first slot configuration corresponds to a SBFD slot configuration or an IBFD slot configuration.

Aspect 24 may be combined with any of aspects 15-23 and further includes deactivating an uplink portion of the first slot configuration or a downlink portion of the first slot configuration to communicate with the UE based on the second slot configuration.

Aspect 25 may be combined with any of aspects 15-24 and further includes converting frequency resources of the first slot configuration within a slot to a downlink band or an uplink band to communicate with the UE based on the second slot configuration.

Aspect 26 may be combined with any of aspects 15-25 and includes that the first slot configuration includes multiple half-duplex slot formats, the aspect further including transmitting an RRC configuration indicating one of the multiple half-duplex slot formats for the second slot configuration.

Aspect 27 may be combined with any of aspects 15-26 and includes that the first power mode corresponds to a first slot configuration associated with the half-duplex communication and the second power mode corresponds to a second slot configuration associated with the full-duplex communication, the second slot configuration corresponding to a SBFD slot configuration or an IBFD slot configuration.

Aspect 28 may be combined with any of aspects 15-27 and further includes adjusting an MCS based on the switch from the first power mode associated with the first duplex type to the second power mode associated with the second duplex type, an adjustment of the MCS being based on at least one of an MCS table, a BLER, or an MCS range.

Aspect 29 is an apparatus for wireless communication for implementing a method as in any of aspects 1-28.

Aspect 30 is an apparatus for wireless communication including means for implementing a method as in any of aspects 1-28.

Aspect 31 may be combined with any of aspects 29-30 and further includes at least one of a transceiver or an antenna coupled to at least one processor of the apparatus.

Aspect 32 is a non-transitory computer-readable medium storing computer executable code, the code when executed by at least one processor causes the at least one processor to implement a method as in any of aspects 1-28.

What is claimed is:

1. An apparatus for wireless communication at a user equipment (UE), comprising:
   a memory; and
   at least one processor coupled to the memory and, based at least in part on information stored in the memory, the at least one processor is configured to:
   receive a first indication that a first power mode of a network entity is associated with a first duplex type for the network entity and a second power mode of the network entity is associated with a second duplex type for the network entity, the first duplex type and the second duplex type corresponding to at least one of full-duplex communication or half-duplex communication;
   receive a second indication of a switch from the first power mode associated with the first duplex type to the second power mode associated with the second duplex type; and
   communicate with the network entity based on the second power mode and the second duplex type for the network entity.

2. The apparatus of claim 1, wherein the at least one processor is further configured to communicate with the network entity during a first time period following the first power mode based on a third mode that corresponds to the at least one of the full-duplex communication or the half-duplex communication.

3. The apparatus of claim 2, wherein the third mode corresponds to a combination of duplex modes.

4. The apparatus of claim 1, wherein the at least one processor is further configured to communicate with the network entity during a second time period prior to the second power mode based on a fourth mode that corresponds to the at least one of the full-duplex communication or the half-duplex communication.

5. The apparatus of claim 4, wherein the fourth mode corresponds to a combination of duplex modes.

6. The apparatus of claim 1, wherein the switch from the first power mode associated with the first duplex type to the second power mode associated with the second duplex type is based on a time gap included between the first power mode and the second power mode.

7. The apparatus of claim 1, wherein the first power mode corresponds to a first slot configuration associated with the full-duplex communication and the second power mode corresponds to a second slot configuration associated with the half-duplex communication.

8. The apparatus of claim 7, wherein the first slot configuration corresponds to a sub-band full-duplex (SBFD) slot configuration or an in-band full-duplex (IBFD) slot configuration.

9. The apparatus of claim 7, wherein the at least one processor is further configured to deactivate an uplink portion of the first slot configuration or a downlink portion of the first slot configuration to communicate with the network entity based on the second slot configuration.

10. The apparatus of claim 7, wherein the at least one processor is further configured to convert frequency resources of the first slot configuration within a slot to a downlink band or an uplink band to communicate with the network entity based on the second slot configuration.

11. The apparatus of claim 7, wherein the first slot configuration includes multiple half-duplex slot formats, the at least one processor further configured to receive a radio resource control (RRC) configuration indicating one of the multiple half-duplex slot formats for the second slot configuration.

12. The apparatus of claim 1, wherein the first power mode corresponds to a first slot configuration associated with the half-duplex communication and the second power mode corresponds to a second slot configuration associated with the full-duplex communication.

13. The apparatus of claim 12, wherein the second slot configuration corresponds to a sub-band full-duplex (SBFD) slot configuration or an in-band full-duplex (IBFD) slot configuration.

14. The apparatus of claim 1, wherein the at least one processor is further configured to adjust a modulation and coding scheme (MCS) based on the switch from the first power mode associated with the first duplex type to the second power mode associated with the second duplex type, an adjustment of the MCS being based on at least one of an MCS table, a block error rate (BLER), or an MCS range.

15. An apparatus for wireless communication at a network entity, comprising:
a memory; and
at least one processor coupled to the memory and, based at least in part on information stored in the memory, the at least one processor is configured to:
output for transmission, to a user equipment (UE), a first indication that a first power mode of the network entity is associated with a first duplex type for the network entity and a second power mode of the network entity is associated with a second duplex type for the network entity, the first duplex type and the second duplex type corresponding to at least one of full-duplex communication or half-duplex communication;
output for transmission, to the UE, a second indication of a switch from the first power mode associated with the first duplex type to the second power mode associated with the second duplex type; and
communicate with the UE based on the second power mode and the second duplex type for the network entity.

16. The apparatus of claim 15, wherein the at least one processor is further configured to switch from the first power mode associated with the first duplex type to the second power mode associated with the second duplex type based on the second indication.

17. The apparatus of claim 15, wherein the first power mode of the network entity includes a first time period following the first power mode based on a third mode that corresponds to the at least one of the full-duplex communication or the half-duplex communication.

18. The apparatus of claim 17, wherein the third mode corresponds to a combination of duplex modes.

19. The apparatus of claim 15, wherein the second power mode of the network entity includes a second time period prior to the second power mode based on a fourth mode that corresponds to the at least one of the full-duplex communication or the half-duplex communication.

20. The apparatus of claim 19, wherein the fourth mode corresponds to a combination of duplex modes.

21. The apparatus of claim 15, wherein the switch from the first power mode associated with the first duplex type to the second power mode associated with the second duplex type is based on a time gap included between the first power mode and the second power mode.

22. The apparatus of claim 15, wherein the first power mode corresponds to a first slot configuration associated with the full-duplex communication and the second power mode corresponds to a second slot configuration associated with the half-duplex communication.

23. The apparatus of claim 22, wherein the first slot configuration corresponds to a sub-band full-duplex (SBFD) slot configuration or an in-band full-duplex (IBFD) slot configuration.

24. The apparatus of claim 22, wherein the at least one processor is further configured to deactivate an uplink portion of the first slot configuration or a downlink portion of the first slot configuration to communicate with the UE based on the second slot configuration.

25. The apparatus of claim 22, wherein the at least one processor is further configured to convert frequency resources of the first slot configuration within a slot to a downlink band or an uplink band to communicate with the UE based on the second slot configuration.

26. The apparatus of claim 22, wherein the first slot configuration includes multiple half-duplex slot formats, the at least one processor further configured to transmit a radio resource control (RRC) configuration indicating one of the multiple half-duplex slot formats for the second slot configuration.

27. The apparatus of claim 15, wherein the first power mode corresponds to a first slot configuration associated with the half-duplex communication and the second power mode corresponds to a second slot configuration associated with the full-duplex communication, the second slot configuration corresponding to a sub-band full-duplex (SBFD) slot configuration or an in-band full-duplex (IBFD) slot configuration.

28. The apparatus of claim 15, wherein the at least one processor is further configured to adjust a modulation and coding scheme (MCS) based on the switch from the first power mode associated with the first duplex type to the second power mode associated with the second duplex type, an adjustment of the MCS being based on at least one of an MCS table, a block error rate (BLER), or an MCS range.

29. A method of wireless communication at a user equipment (UE), comprising:
receiving a first indication that a first power mode of a network entity is associated with a first duplex type for the network entity and a second power mode of the network entity is associated with a second duplex type for the network entity, the first duplex type and the second duplex type corresponding to at least one of full-duplex communication or half-duplex communication;
receiving a second indication of a switch from the first power mode associated with the first duplex type to the second power mode associated with the second duplex type; and
communicating with the network entity based on the second power mode and the second duplex type for the network entity.

30. A method of wireless communication at a network entity, comprising:
outputting for transmission to a user equipment (UE), a first indication that a first power mode of the network entity is associated with a first duplex type for the network entity and a second power mode of the network entity is associated with a second duplex type for the network entity, the first duplex type and the second duplex type corresponding to at least one of full-duplex communication or half-duplex communication;
outputting for transmission to the UE, a second indication of a switch from the first power mode associated with the first duplex type to the second power mode associated with the second duplex type; and
communicating with the UE based on the second power mode and the second duplex type for the network entity.

* * * * *